(12) United States Patent
Naka

(10) Patent No.: US 8,136,043 B2
(45) Date of Patent: Mar. 13, 2012

(54) GUI GENERATION APPARATUS AND METHOD FOR GENERATING GUI

(75) Inventor: Akiteru Naka, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 777 days.

(21) Appl. No.: 11/954,149

(22) Filed: Dec. 11, 2007

(65) Prior Publication Data

US 2008/0155406 A1    Jun. 26, 2008

(30) Foreign Application Priority Data

Dec. 26, 2006    (JP) .................... 2006-350155

(51) Int. Cl.
*G06F 3/00* (2006.01)
*G06F 3/01* (2006.01)

(52) U.S. Cl. ......... 715/762; 715/763; 715/764; 715/765
(58) Field of Classification Search ............ 715/762, 715/763, 764, 765, 767; 717/109
See application file for complete search history.

(56) References Cited

U.S. PATENT DOCUMENTS

| | | | | |
|---|---|---|---|---|
| 2002/0184610 | A1* | 12/2002 | Chong et al. | 717/109 |
| 2003/0126555 | A1* | 7/2003 | Aggarwal et al. | 715/505 |
| 2003/0233296 | A1* | 12/2003 | Wagner | 705/31 |
| 2005/0165857 | A1 | 7/2005 | Naka et al. | 707/200 |
| 2005/0198563 | A1* | 9/2005 | Kristjansson | 715/507 |

FOREIGN PATENT DOCUMENTS

JP    11-282658    10/1999

* cited by examiner

*Primary Examiner* — Nicholas Augustine
(74) *Attorney, Agent, or Firm* — Fitzpatrick, Cella, Harper & Scinto

(57) ABSTRACT

A GUI generation apparatus comprises: a storage unit adapted to store association information that associates an input/output GUI component relating to the input and output of data with a data model that stores data; and a reflection unit adapted to, upon receiving an input of data through the input/output GUI component, reflect the inputted data in the data model that is associated with the input/output GUI component in the association information, wherein, upon a change of data in the data model, the reflection unit reflects the changed data in the input/output GUI component that is associated with the data model in the association information.

5 Claims, 40 Drawing Sheets

FIG. 5A

```
SCREEN DEFINITION FILE
<ddml>
    <dialog id="ID_D1">                                          ──301
        <bounds x="10" y="10" w="320" h="240"/>
        <children>                                    ──304
            <control idref="ID_C1"/>
            <control idref="ID_C2"/>
        </children>
    </dialog>
    <control id="ID_C1" type="TextField">                        ──302
        <bounds x="150" y="15" w="80" h="15"/>
        <attribute>                                   ──305
            <string value="param1" key="property"/>
        </attribute>
    </control>
    <control id="ID_C2" type="Button">                           ──303
        <bounds x="15" y="300" w="80" h="15"/>
        <attribute>                                   ──305
            <string value="OK" key="text"/>
            <string value="ev.ok" key="event"/>
        </attribute>
    </control>
</ddml>
```

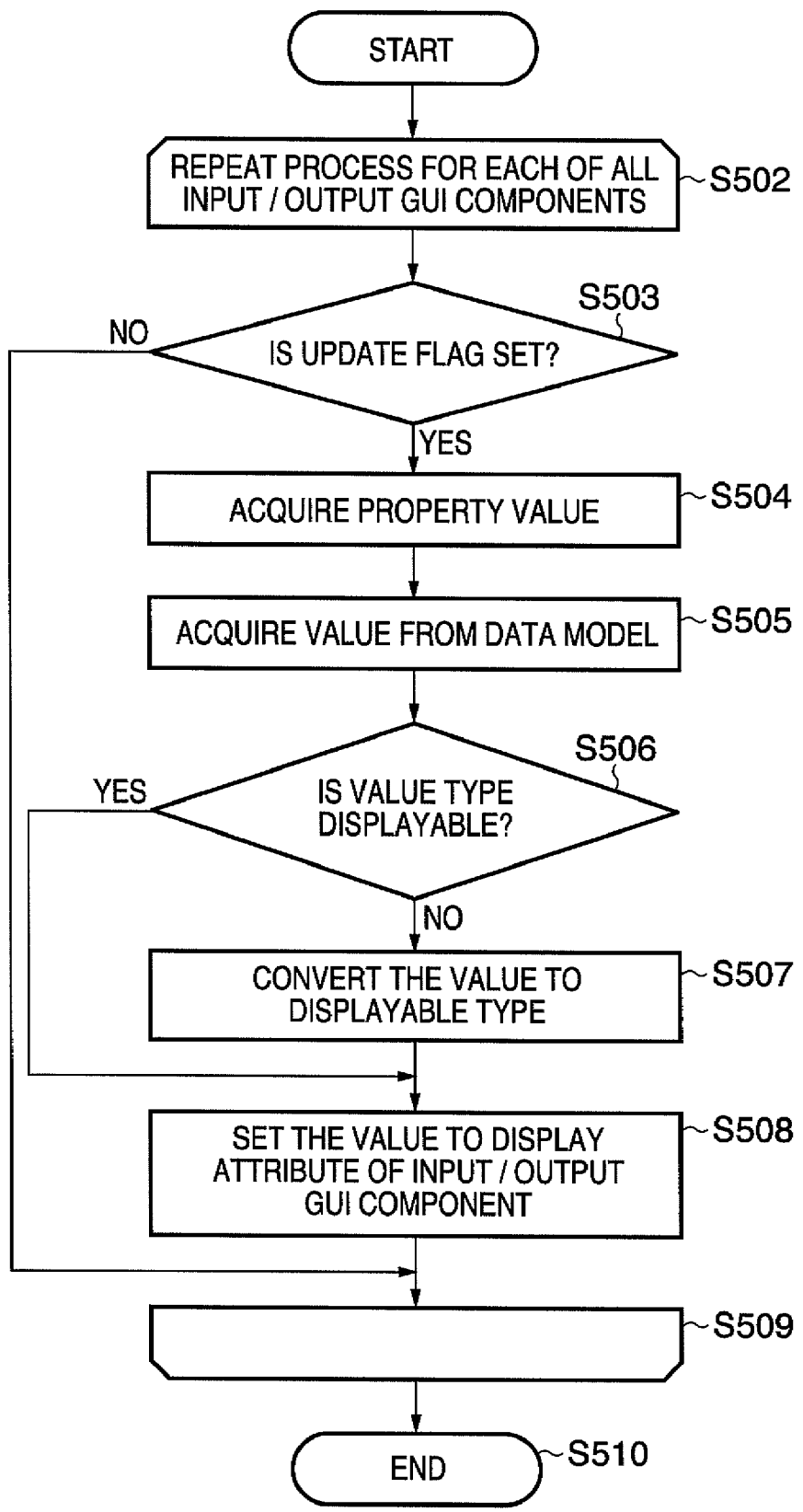

FIG. 10A

| PROPERTY | GUI COMPONENT | VALUE |
|----------|---------------|-------|
| param1 | ID_C1 | 100 | ~501
|  |  |  |
|  |  |  |

F I G. 10B
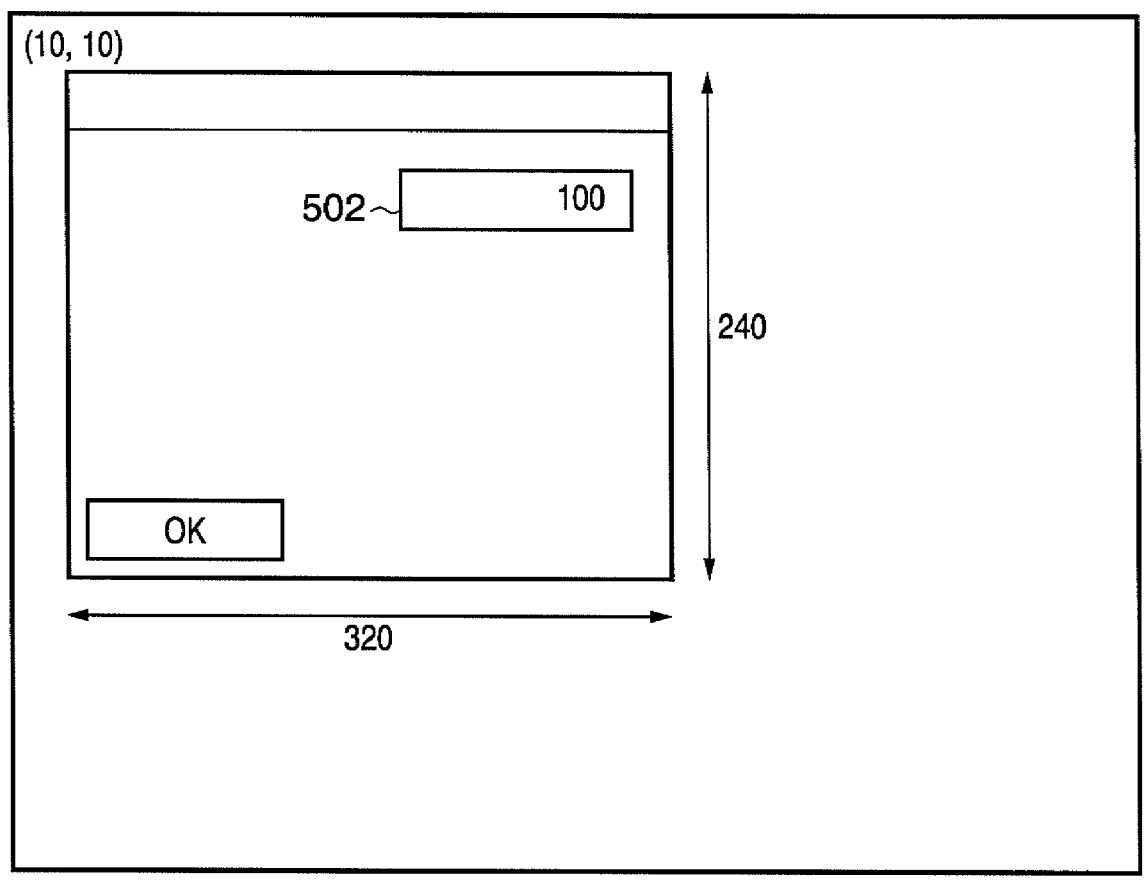

FIG. 13A

TRANSITION DEFINITION FILE(Main) — 701

```
<ccml>
  <head>
    <ev:listener event="ev.calc1">                                    — 705
      <action id="LOGIC PROGRAM A"/>
    </ev:listener>
    <ev:listener event="ev.calc2">                                    — 704
      <action id="LOGIC PROGRAM B"/>
      <invoke.href="TRANSITION DEFINITION FILE(Sub)"/>
    </ev:listener>
  </head>
  <body>
    <ddml href="SCREEN DEFINITION FILE(Main)">                        — 703
  </body>
</ccml>
```

FIG. 13C

```
TRANSITION DEFINITION FILE(Sub)                          — 713

<ccml>
    <head/>
    <body>
        <ddml href="SCREEN DEFINITION FILE(Sub)"/>       — 715
    </body>
</ccml>
```

FIG. 13D

SCREEN DEFINITION FILE(Sub) — 714

```
<ddml>
  <body>
    <dialog id="Main">                             ─ 716
      <bounds x="0" y="0" w="280" h="180"/>
      <children>
        <control idref="ID_C11"/>
        OMITTED
      </children>
    </dialog>
    <control id="ID_C11" type="TextField">         ─ 717
      <bounds x="150" y="15" w="80" h="15"/>
      <attribute>
        <string value="calc2" key="property"/>
      </attribute>
    </control>
    OMITTED
  </body>
</ddml>
```

F I G. 13E

```
<<LOGIC PROGRAM A>>
X=DATA MODEL. getValue("param1");
Y=DATA MODEL. getValue("param2");
S=X*Y;
DATA MODEL. setValue("calc1", S);
```
~718

F I G. 13F

```
<<LOGIC PROGRAM B>>
X=DATA MODEL. getValue("param1");
Y=DATA MODEL. getValue("param2");
Z=DATA MODEL. getValue("param3");
S=X*Y*Z;
DATA MODEL. setValue("calc2", S);
```
~719

F I G. 15A
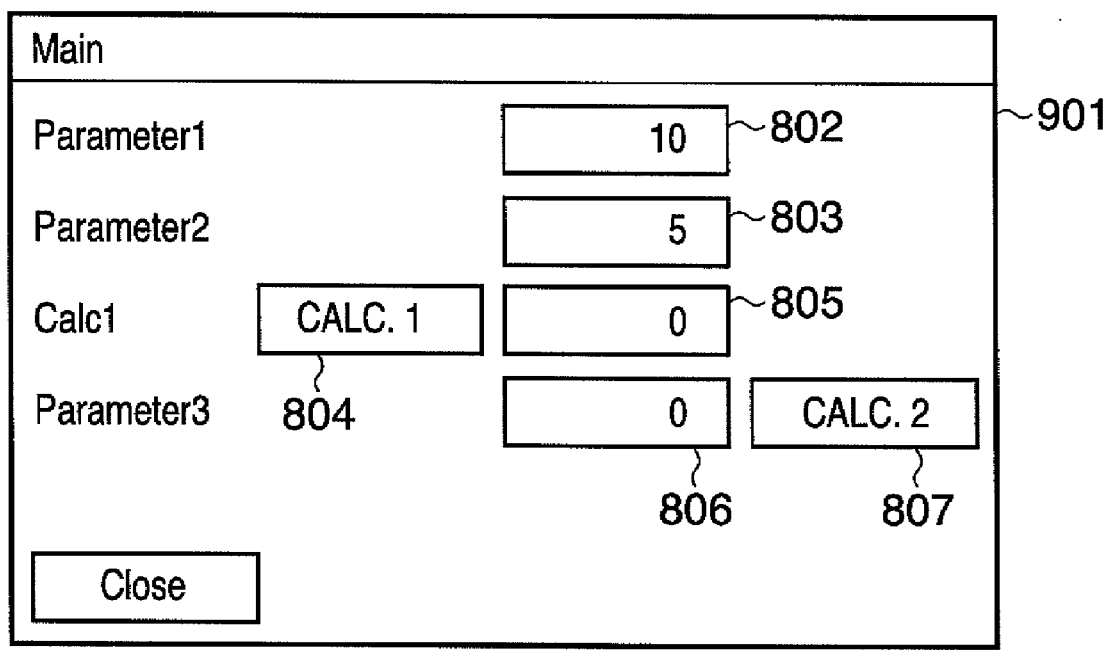

F I G. 15B

| PROPERTY | GUI COMPONENT | VALUE |
|---|---|---|
| param1 | ID_C1 | 0 ⇒ 10 |
| param2 | ID_C2 | 0 ⇒ 5 |
| param3 | ID_C3 | 0 |
| calc1 | ID_C4 | 0 |
| calc2 | ID_C5 | 0 |
|  |  |  |

902

F I G. 15C
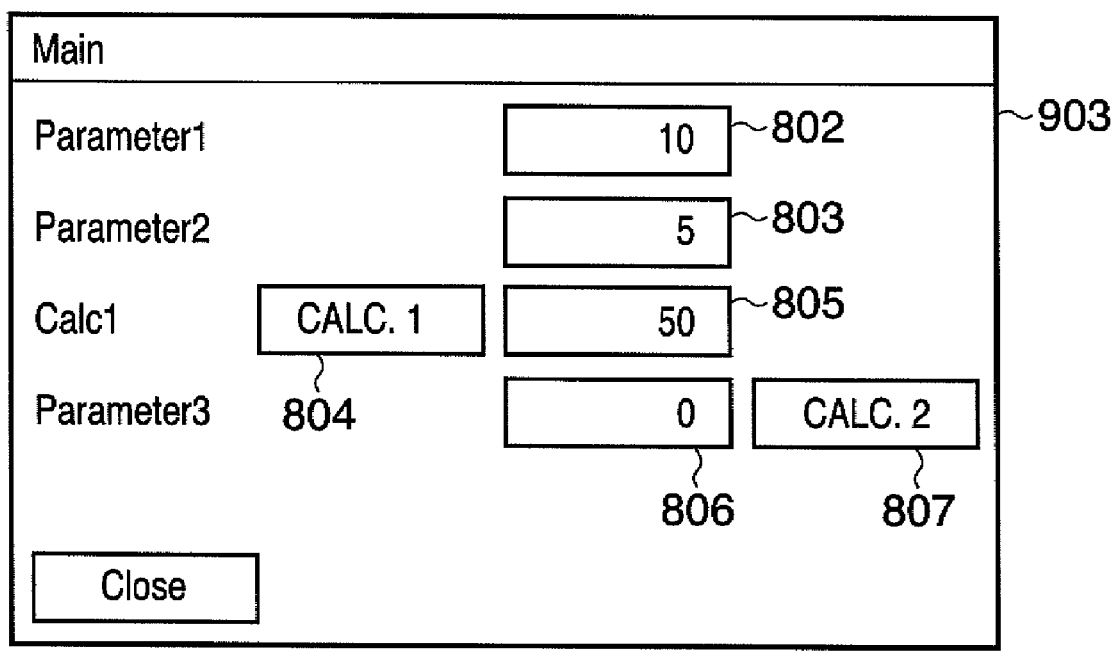

FIG. 15D

| PROPERTY | GUI COMPONENT | VALUE |
|---|---|---|
| param1 | ID_C1 | 10 |
| param2 | ID_C2 | 5 |
| param3 | ID_C3 | 0 |
| calc1 | ID_C4 | 0 ⇒ 50 |
| calc2 | ID_C5 | 0 |
|  |  |  |

FIG. 15F

| PROPERTY | GUI COMPONENT | VALUE |
|---|---|---|
| param1 | ID_C1 | 10 |
| param2 | ID_C2 | 5 |
| param3 | ID_C3 | 3 |
| calc1 | ID_C4 | 50 |
| calc2 | ID_C5 | 150 |
|  |  |  |

```
TRANSITION DEFINITION FILE(Main)                              ~701

<ccml>
  <head>
    <ev:listener event="ev.calc1">
      <action id="LOGIC PROGRAM 1"/>
    </ev:listener>
    <ev:listener event="ev.calc2">
      <action id="LOGIC PROGRAM 2"/>
      <invoke href="TRANSITION DEFINITION FILE(Sub)"/>      ~1003
    </ev:listener>
  </head>
  <body>
    <ddml href="SCREEN DEFINITION FILE(Main)">
  </body>
</ccml>
```

F I G. 16B

SCREEN DEFINITION FILE(Main) — 702, 706

```xml
<ddml>
 <body>
  <dialog id="Main">
   <bounds x="0" y="0" w="320" h="240"/>
   <children>
    <control idref="ID_C1"/>
    <control idref="ID_C2"/>
    <control idref="ID_C3"/>
    <control idref="ID_C4"/>
    <control idref="ID_C5"/>
    <control idref="ID_C6"/>
    <control idref="ID_C11"/>   ← 1001
    OMITTED
   </children>
  </dialog>
  <control id="ID_C1" type="TextField">
   <bounds x="150" y="15" w="80" h="15"/>
   <attribute>
    <string value="param1" key="property"/>
   </attribute>
  </control>
  <control id="ID_C2" type="TextField">
   <bounds x="150" y="40" w="80" h="15"/>
   <attribute>
    <string value="param2" key="property"/>
   </attribute>
  </control>
  <control id="ID_C3" type="TextField">
   <bounds x="150" y="90" w="80" h="15"/>
   <attribute>
    <string value="param3" key="property"/>
   </attribute>
  </control>
  <control id="ID_C4" type="TextField">
   <bounds x="150" y="65" w="80" h="15"/>
   <attribute>
    <string value="calc1" key="property"/>
   </attribute>
  </control>
  <control id="ID_C5" type="Button">
   <bounds x="90" y="65" w="50" h="15"/>
    <attribute>
     <string value="ev.calc1" key="event"/>
    </attribute>
   </control>
   <control id="ID_C6" type="Button">
    <bounds x="90" y="115" w="50" h="15"/>
    <attribute>                    ← 1004
     <string value="ev.calc2" key="event"/>
    </attribute>
   </control>
   <control id="ID_C11" type="TextField">
    <bounds x="150" y="115" w="80" h="15"/>
    <attribute>                    ← 1005
     <string value="calc2" key="property"/>
    </attribute>
   </control>
   OMITTED
  </body>           1002
 </ddml>
```

SCREEN DEFINITION FILE(SUB) — 714, 716

```xml
<ddml>
 <body>
  <dialog id="Main">
   <bounds x="0" y="0" w="280" h="180"/>
   <children>
    <control idref="ID_C11"/>
    OMITTED
   </children>
  </dialog>
  <control id="ID_C11" type="TextField">
   <bounds x="150" y="15" w="80" h="15"/>
   <attribute>
    <string value="calc2" key="property"/>
   </attribute>
  </control>
  OMITTED
 </body>              717
</ddml>
```

TRANSITION DEFINITION FILE(Sub)

```
<ccml>
    <head/>
    <body>
        <ddml href="SCREEN DEFINITION FILE(Sub)"/>
    </body>
</ccml>
```

FIG. 16D

```
<<LOGIC PROGRAM 1>>
X=DATA MODEL. getValue("param1");
Y=DATA MODEL. getValue("param2");
S=X*Y;
DATA MODEL. setValue("calc1", S);
```
~718

F I G. 16E

```
<<LOGIC PROGRAM 2>>
X=DATA MODEL. getValue("param1");
Y=DATA MODEL. getValue("param2");
Z=DATA MODEL. getValue("param3");
S=X*Y*Z;
DATA MODEL. setValue("calc2", S);
```
~719

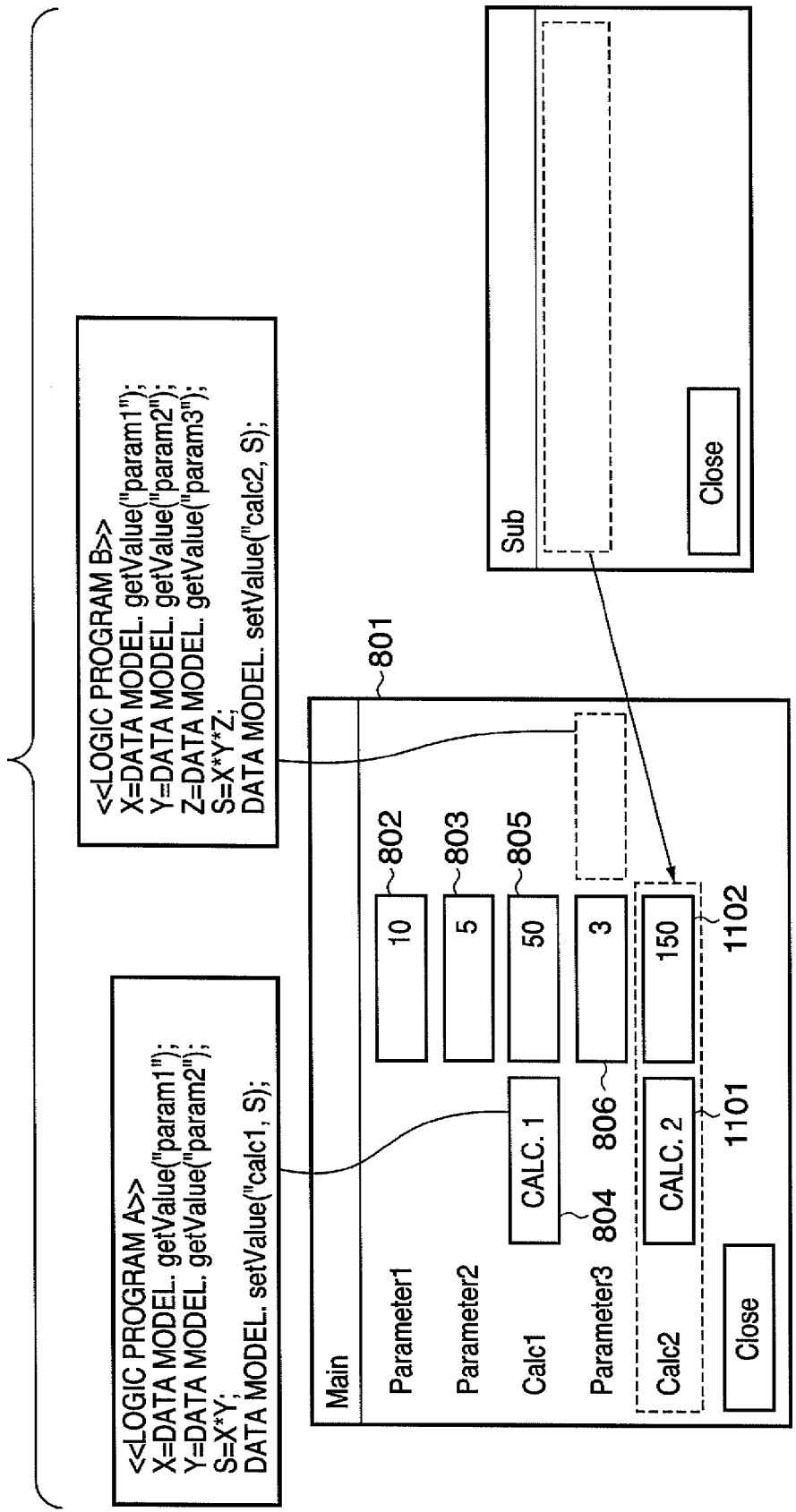

FIG. 18B

| PROPERTY | GUI COMPONENT | VALUE |
|---|---|---|
| param1 | ID_C1 | 0 ⇒ 10 |
| param2 | ID_C2 | 0 ⇒ 5 |
| param3 | ID_C3 | 0 |
| calc1 | ID_C4 | 0 |
| calc2 | ID_C5 | 0 |
|  |  |  |

| Main | | | |
|---|---|---|---|
| Parameter1 | | 10 ~802 | ~1203 |
| Parameter2 | | 5 ~803 | |
| Calc1 | CALC. 1 | 50 ~805 | |
| Parameter3 | 804 | 0 ~806 | |
| Calc2 | CALC. 2 | 0 | |
| Close | 1101 | 1102 | |

FIG. 18D

| PROPERTY | GUI COMPONENT | VALUE |
|---|---|---|
| param1 | ID_C1 | 10 |
| param2 | ID_C2 | 5 |
| param3 | ID_C3 | 0 |
| calc1 | ID_C4 | 0 ⇒ 50 |
| calc2 | ID_C5 | 0 |
|  |  |  |

| PROPERTY | GUI COMPONENT | VALUE |
|---|---|---|
| param1 | ID_C1 | 10 |
| param2 | ID_C2 | 5 |
| param3 | ID_C3 | 3 |
| calc1 | ID_C4 | 50 |
| calc2 | ID_C5 | 150 |
|  |  |  |

1206

GUI GENERATION APPARATUS AND METHOD FOR GENERATING GUI

BACKGROUND OF THE INVENTION

1. Field of the Invention

The present invention relates to a GUI generation apparatus and a method for generating a GUI.

2. Description of the Related Art

To realize a change of screens using a definition file, a technology is disclosed in which serviceability is improved by separately providing a screen display unit, a program execution unit and a database operation unit so as to facilitate the change of screens (see, for example, Japanese Patent Laid-Open No. 11-282658).

As another technology for dynamically generating a user interface based on a definition file, there is Java Server (registered trademark) Pages (JSP) technology for creating web screens. JSP technology employs what are called "JSP tags" together with HTML document tags that represent screen designs. Upon finding JSP tags in an HTML document, a server can change the screen design by converting the tags into appropriate tags. As another technology for creating WEB screens, there is Java Server (registered trademark) Faces (hereinafter referred to as "JSF") technology. JSF technology is a technology to separate a UI and a logic using JSP for screen designing.

According to the conventional techniques described above, only by editing the definition file, the arrangement of the components within a screen can be changed freely.

However, in order to effect a change across screens, part of the programs used to update the screen display need to be rewritten, so it was difficult to effect the change across screens only by editing the definition file.

SUMMARY OF THE INVENTION

Having been conceived in light of the problem described above, it is an object of the present invention to achieve a change across screens without rewriting parts of programs.

According to one aspect of the present invention, a GUI generation apparatus comprises:
- a storage unit adapted to store association information that associates an input/output GUI component relating to the input and output of data with a data model that stores data; and
- a reflection unit adapted to, upon receiving an input of data through the input/output GUI component, reflect the inputted data in the data model that is associated with the input/output GUI component in the association information,
- wherein, upon a change of data in the data model, the reflection unit reflects the changed data in the input/output GUI component that is associated with the data model in the association information.

According to another aspect of the present invention, a method for generating a GUI in a GUI generation apparatus comprises the steps of:
- a data model reflection step of, upon receiving an input of data through an input/output GUI component relating to the input and output of data, reflecting the inputted data in a data model that is associated with the input/output GUI component in association information stored in a storage unit; and
- an input/output GUI component reflection step, carried out upon a change of data in the data model, of reflecting the changed data in the input/output GUI component that is associated with the data model in the association information.

Further features of the present invention will become apparent from the following description of exemplary embodiments with reference to the attached drawings.

BRIEF DESCRIPTION OF THE DRAWINGS

FIGS. 5A and 5B are diagrams illustrating examples of a screen definition file 202 and a transition definition file 203.

FIG. 9 is a flowchart illustrating in detail the process flow of the input/output GUI component update process of step S110 in FIG. 3.

FIGS. 10A and 10B are (second) diagrams illustrating examples of a data model and a GUI screen.

FIGS. 13A, 13B, 13C, 13D, 13E and 13F are diagrams of screen definition files and transition definition files before customization (change).

FIGS. 15A, 15B, 15C, 15D, 15E and 15F are diagrams illustrating the relation between a data model and a screen image when the GUI screen of FIG. 14 is operated.

FIGS. 16A, 16B, 16C, 16D and 16E are diagrams of a screen definition file and a transition definition file after customization (change) to combine content displayed on a Sub screen in the Main screen.

FIG. 17 is a diagram of a GUI screen created based on the screen definition file, transition definition file and logic programs in FIGS. 16A, 16B, 16C, 16D and 16E.

FIGS. 18A, 18B, 18C, 18D, 18E and 18F are diagrams illustrating the relation between a data model and a screen image when the GUI screen in FIG. 17 is operated.

DESCRIPTION OF THE EMBODIMENTS

Hereinafter, an embodiment of the present invention shall be described with reference to the accompanying drawings.

Figure 1:
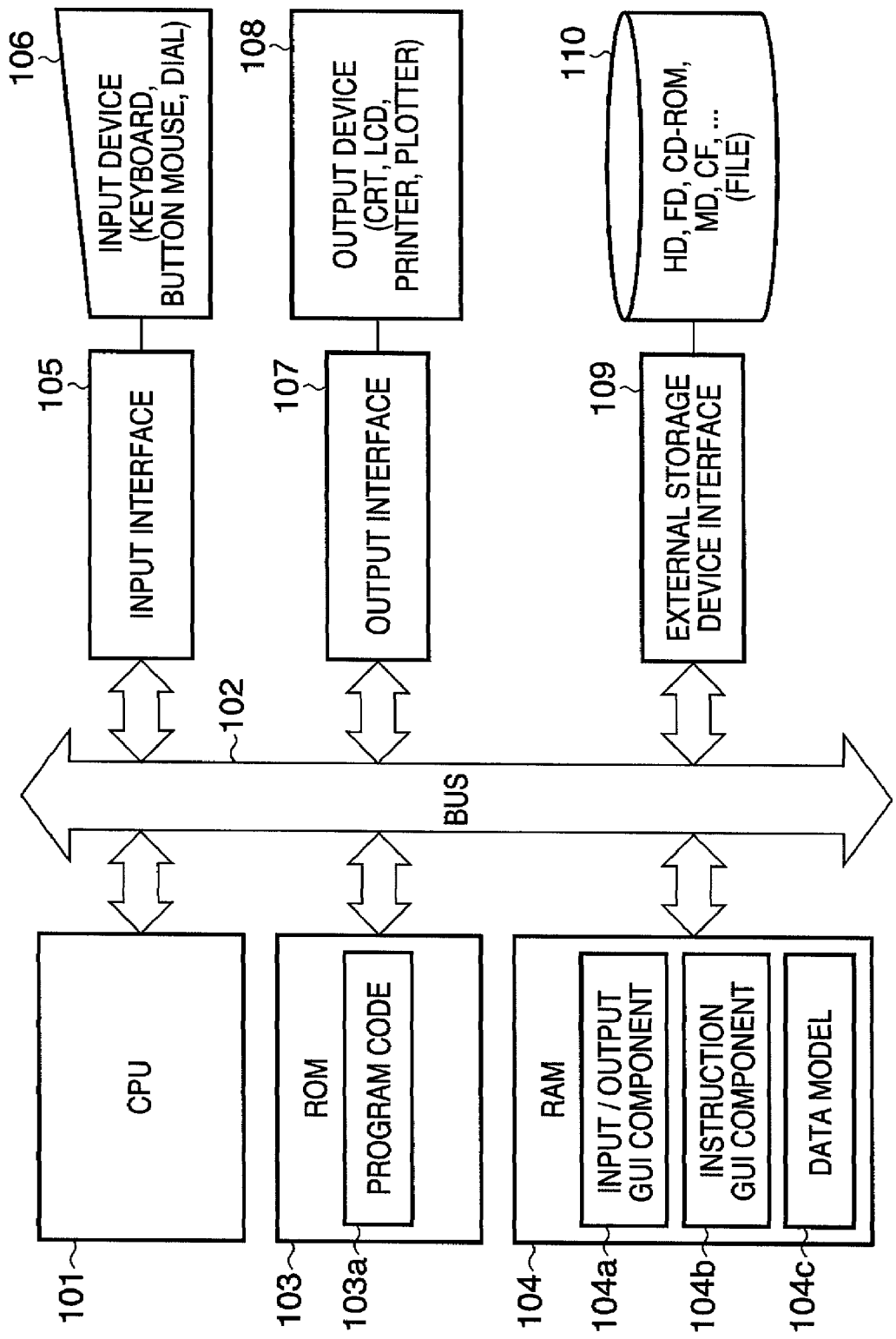
FIG. 1 is a diagram of the hardware configuration of an information processing apparatus, which is an example of a GUI generation apparatus.

FIG. 1 is a diagram of the hardware configuration of an information processing apparatus, which is an example of a GUI (Graphical User Interface) generation apparatus.

A CPU 101 accesses, through a bus 102, devices 103 to 110, which will be described below, and controls these devices. A read-only memory (ROM) 103 is accessible from the CPU 101 through the bus 102, and stores program code 103a. A random access memory (RAM) 104 has regions for storing an input/output GUI component, an instruction GUI component and a data model (hereinafter referred to as "regions 104a, 104b and 104c", respectively) that are generated by the execution of the program code 103a by the CPU 101. An input interface 105 receives inputs input through an input device 106 such as a keyboard, mouse, button or dial.

An output interface 107 performs display/output of data to an output device 108 such as a CRT, LCD, printer or plotter. An external storage device interface 109 performs input/output of data to and from an external storage device 110, such as a HD, FD, CD-ROM, MD or CF.

This embodiment shall be described in the context of the program code 103a being stored in the ROM 103 and the regions (104a to 104c) for storing each data to be processed being provided in the RAM 104. However, all of these can also be provided in the external storage device 110, and can be loaded from the external storage device 110 to the RAM 104 before use where appropriate. It is also possible to provide them in the cache memory of the CPU 101.

Figure 2:
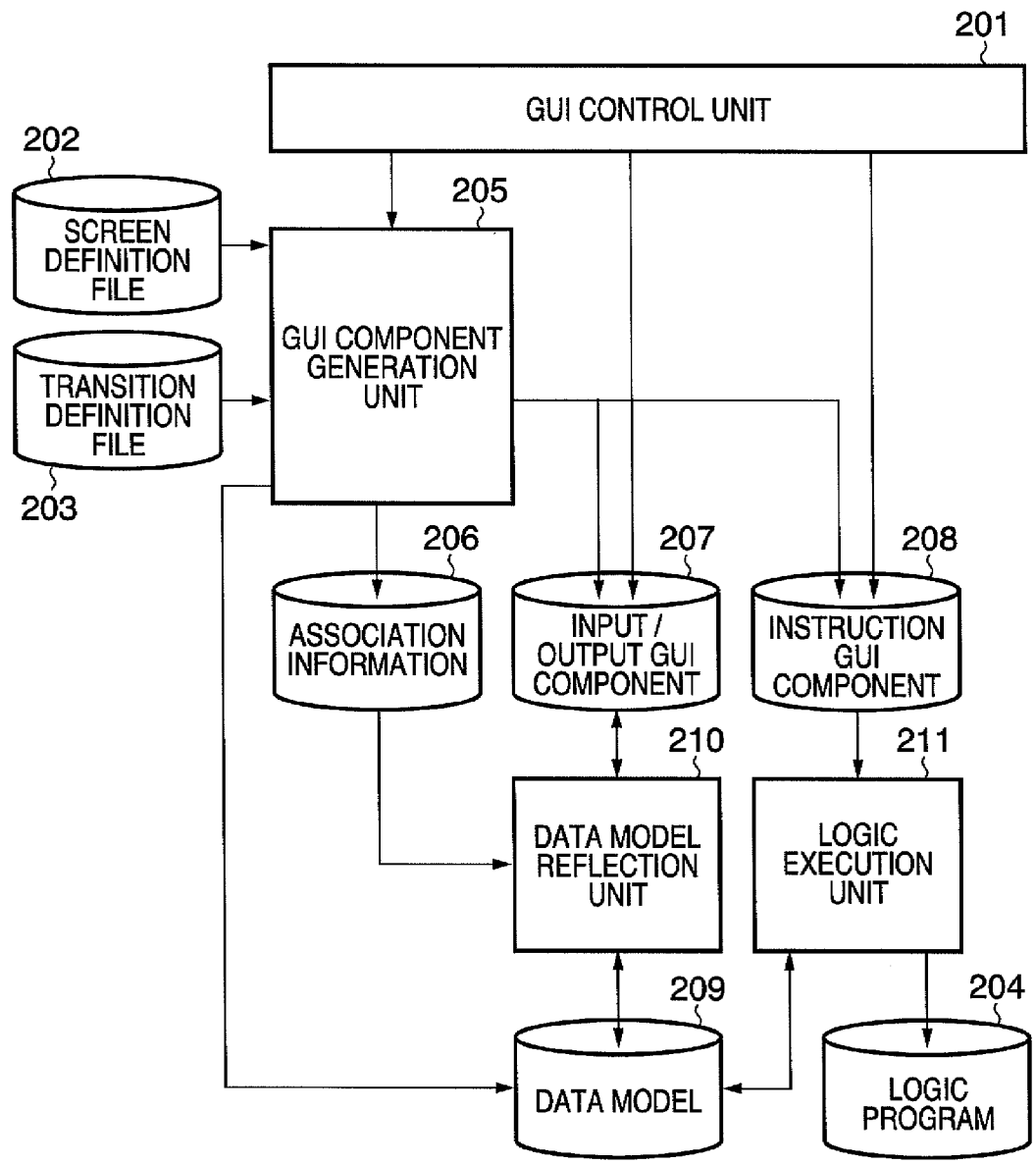
FIG. 2 shows a functional configuration of an information processing apparatus, and a data flowchart illustrating, as an example, the relationship between the functional configuration and the data stored in the storage regions indicated by 104a to 104c in FIG. 1.

FIG. 2 shows a functional configuration of the information processing apparatus, and a data flowchart illustrating, as an example, the relationship between the functional configuration and the data stored in the storage regions indicated by 104a to 104c in FIG. 1.

A GUI control unit 201 handles data inputted through the input interface 105. The user can input data and send instructions to each processing unit with this GUI control unit 201.

A screen definition file 202 is stored in the external storage device 110, and defines layout information (configuration information) or the like for the screen loaded by the program code 103a. An example of the screen definition file 202 is shown, for example, in FIG. 5A, which will be described later.

A transition definition file 203 defines transition information for the screen loaded by the program code 103a, association information describing the association between an instruction GUI component 208 and a logic program 204, and the like. An example of the transition definition file 203 is shown, for example, in FIG. 5B, which will be described later.

The logic program 204 is stored in the external storage device 110, and is loaded into the CPU 101 based on the program code 103a. The logic program 204 is a program defining a process executed in response to a screen operation.

A GUI component generation unit 205 generates a GUI component (or information on a GUI component) to be displayed on the screen based on the screen definition file 202 and the transition definition file 203.

Association information 206 is information for associating a GUI component generated by the GUI component generation unit 205 with a data model.

An input/output GUI component 207 is a GUI component, such as a text field, that is generated by the GUI component generation unit 205 and into which the user can provide an input or from which the user can receive a result. The input/output GUI component 207 is controlled (or operated) by the GUI control unit 201.

The instruction GUI component 208 is a GUI component, such as a button, that is generated by the GUI component generation unit 205 and executes processing in response to a user's operation. The instruction GUI component 208 is controlled (or operated) by the GUI control unit 201.

A data model 209 stores the data input through the input device 106 and the result (processing result) obtained through the execution of the logic program 204.

A data model reflection unit 210 changes the value (or output data) of the input/output GUI component 207 according to the content (value or data) that is stored or having been stored in the data model 209. Also, if a value (or data) is input into the input/output GUI component 207, the data model reflection unit 210 reflects the input in the data model 209, for example by storing the input value in the data model 209.

A logic execution unit 211 executes processing based on the logic program 204 having been associated with the instruction GUI component 208 in the transition definition file 203, upon receiving an event such as depressing a button through the instruction GUI component 208. The logic execution unit 211 executes processing according to the content of the logic program 204 and stores the result obtained through the execution of the program in the data model 209.

The GUI control unit 201, the GUI component generation unit 205, the data model reflection unit 210, the logic execution unit 211, and the like can also be referred to as the functional configuration of an application program (or an application).

Figure 3:
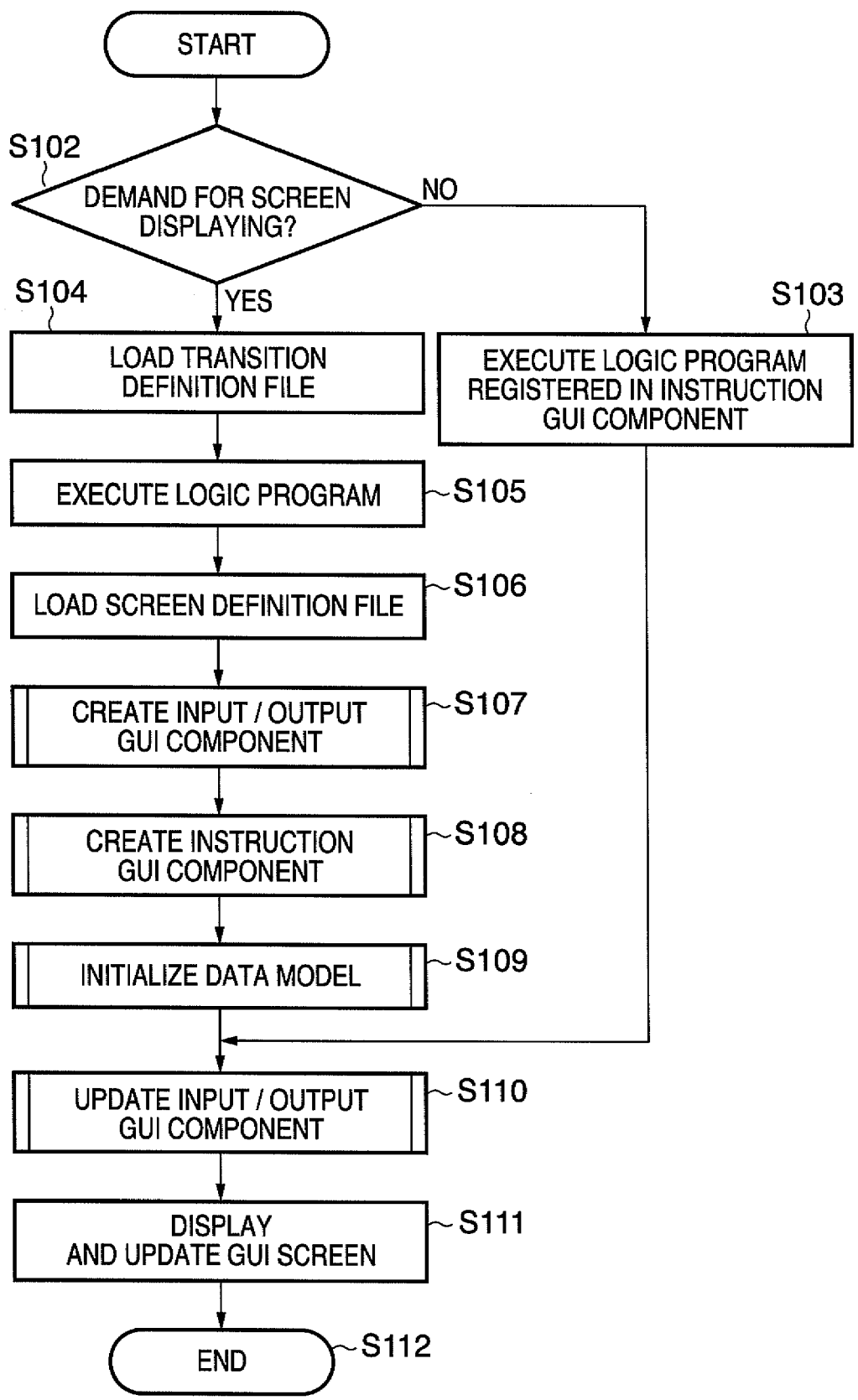
FIG. 3 is a flowchart illustrating an overall processing procedure performed by an information processing apparatus according to an embodiment of the present invention.

FIG. 3 is a flowchart illustrating an overall processing procedure performed by the information processing apparatus of the present embodiment.

In step S102, the GUI control unit 201 performs a process to determine whether a demand from the user is a demand for screen displaying or a demand for the execution of the logic program. In step S102, if the GUI control unit 201 determines that the user's demand is a demand for the execution of the logic program, the process advances to step S103. Conversely, if the GUI control unit 201 determines in step S102 that the user's demand is a demand for screen displaying, the process advances to step S104.

In step S103, the logic execution unit 211 performs a process to execute the logic program associated with the instruction GUI component, such as the depressed button, in the transition definition file 203 (or executes processing based on the logic program).

In step S104, the GUI component generation unit 205 performs a process to load the transition definition file 203 containing information on the GUI screen to be displayed, a transition destination corresponding to the depression of the button and the execution of the logic program.

Subsequently, in step S105, if the logic execution unit 211 finds the logic program to be executed during the startup of the screen in the transition definition file loaded in step S104, the logic execution unit 211 performs a process to start and execute the logic program.

Then, in step S106, the GUI component generation unit 205 performs a process to specify a GUI screen as a result of loading the transition definition file in step S104, and to load the screen definition file 202 containing layout information for the GUI screen. Next, in step S107, the GUI component generation unit 205 performs a process to create an input/output GUI component based on the screen definition file loaded in step S106. This input/output GUI component creation process will be described later in detail with reference to FIG. 4.

Then, in step S108, the GUI component generation unit 205 performs a process to create an instruction GUI component based on the screen definition file loaded in step S106 and the transition definition file loaded in step S104. This instruction GUI component creation process will be described later in detail with reference to FIG. 7.

Next, in step S109, the data model reflection unit 210 performs a process to initialize the data model 209. This data model initialization process will be described later in detail with reference to FIG. 8.

Next, in step S110, the data model reflection unit 210 performs a process to update the input/output GUI component associated with the data model 209, which has been initialized in step S109, in the association information 206. This input/output GUI component update process will be described later in detail with reference to FIG. 9.

Next, in step S111, the GUI control unit 201 performs a process to display a GUI screen on the output device 108 with the input/output GUI component and the instruction GUI component. Then, the process advances to step S112, where the information processing apparatus terminates the process shown in FIG. 3.

Figure 4:
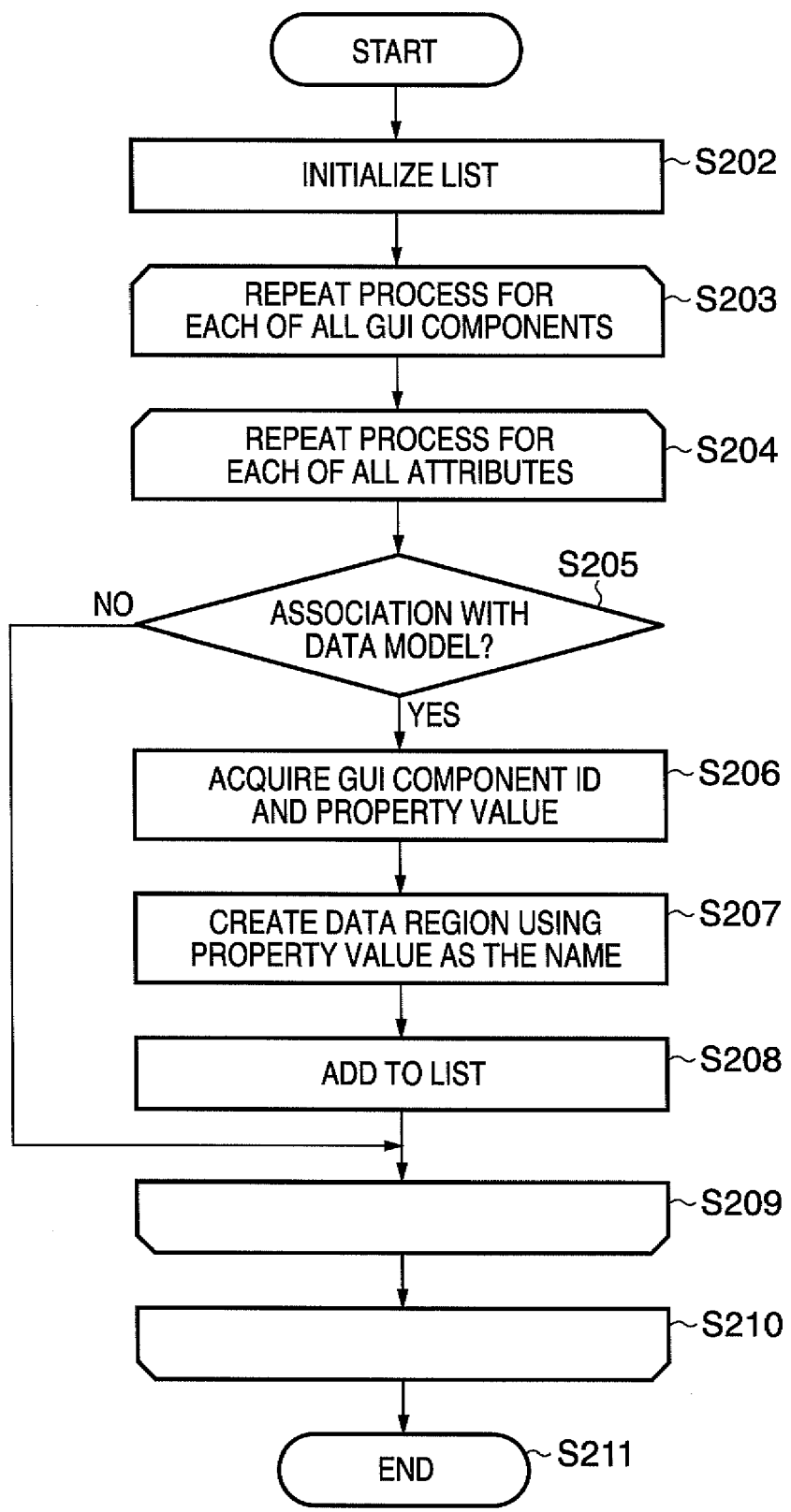
FIG. 4 is a flowchart illustrating in detail the process flow of the input/output GUI component creation process of step S107 in FIG. 3.

FIG. 4 is a flowchart illustrating in detail a process flow of the input/output GUI component creation process of step S107 in FIG. 3. In step S202, the GUI component generation unit 205 performs a process to initialize a list for creating an input/output GUI component.

In step S203, the GUI component generation unit 205 repeats the process ranging from step S204 to step S209 for each of all the GUI components contained in the screen definition file 202.

In step S204, the GUI component generation unit 205 repeats the process ranging from step S205 to step S208 for each of all the attributes of the GUI components.

In step S205, the GUI component generation unit 205 performs a process to acquire one attribute and to determine whether or not the attribute is an attribute associated with the data model. If the GUI component generation unit 205 determines that the acquired attribute is an attribute associated with the data model, the process advances to step S206. If the GUI component generation unit 205 determines that the acquired attribute is not an attribute associated with the data model, the process advances to step S209.

In step S206, the GUI component generation unit 205 performs a process to acquire the ID (GUI component ID) of the GUI component for the attribute associated with the data model among the attributes of the GUI component and the property value that has been set for the acquired attribute.

In step S207, the GUI component generation unit 205 performs a process to create one data region in the data model using the property value acquired in step S206 as its name. If the data model already has a data region having the same name, the GUI component generation unit 205 does not create a new data region, and the process advances to the next step.

In step S208, the GUI component generation unit 205 performs a process to add the GUI component ID and property value acquired in step S206 to the list initialized in step S202.

In step S209, if the GUI component generation unit 205 finishes reflecting the settings for all attributes, the process advances to step S210.

In step S210, if the GUI component generation unit 205 finishes reflecting the settings for all GUI components, the process advances to step S211, where the process shown in FIG. 4 ends.

FIG. 5A is a diagram illustrating an example of the screen definition file 202.

Reference numeral 301 denotes a statement portion concerning the dialog of an entire GUI screen. The bounds tag states the location in the output device 108 in which the dialog is to be displayed and the size of the dialog. In 301, <bounds x="10" y="10" w="320" h="240"/> is written. Accordingly, the dialog is displayed at the position with the coordinates (10, 10) with a width of 320 and a height of 240.

Reference numeral 302 denotes definition information that configures a Text Field type input/output GUI component. Reference numeral 303 denotes definition information that configures a Button type instruction GUI component. The input/output GUI component and the instruction GUI component are arranged on the dialog defined in reference numeral 301 according to the bounds tag elements.

In 302, <bounds x="150" y="15" w="80" h="15"/> is written. Accordingly, the Text Field type input/output GUI component with a width of 80 and a height of 15 is arranged at the position with the coordinates (150, 15).

In 303, <bounds x="15" y="300" w="80" h="15"/> is written. Accordingly, the Button type instruction GUI component with a width of 80 and a height of 15 is arranged at the position with the coordinates (15, 300).

Based on the type attribute of the control tag, the GUI component generation unit 205 determines whether the component is an instruction GUI component or an input/output GUI component.

Reference numeral 304 denotes child tags that control the GUI components arranged in the dialog. The id elements and idref elements of the control tags express the relationship between the defining GUI component and the referenced GUI component, and state that the referenced GUI component controls the defining GUI component as a child component. In FIG. 5A, it is stated that the input/output GUI component 302 and the instruction GUI component 303 are arranged in the dialog 301.

Reference numeral 305 denotes the attributes of the GUI components, which are used according to the specification of each GUI component. In step S205 in FIG. 4, the GUI component generation unit 205 performs a process to determine whether or not the attribute is an attribute associated with the data model based on this attribute portion.

For example, if the input/output GUI component 302 is specified such that if the value of the attribute "key" is "property", there is an association with the data model, then in step S206 in FIG. 4, the GUI component generation unit 205 acquires param1, which is a value attribute, as the property value. The GUI component generation unit 205 also acquires ID_C1 as the GUI component ID.

Figure 5B:
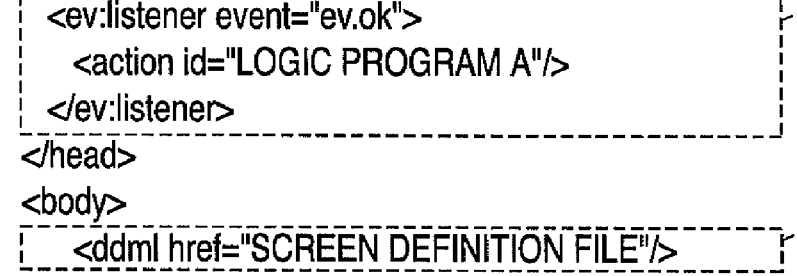

FIG. 5B is a diagram illustrating an example of the transition definition file 203.

Reference numeral 311 denotes an event handler that states which logic program 204 is executed upon receiving an event issued when the instruction GUI component of the GUI screen is operated. In reference numeral 311, it is stated that if an event "ev.ok" is handled, logic program A is executed.

Reference numeral 312 denotes a screen definition file to be displayed on the screen when a screen transition occurs. For example, the GUI control unit 201 displays a GUI screen using the screen definition file written in the transition definition file.

Figure 6A:
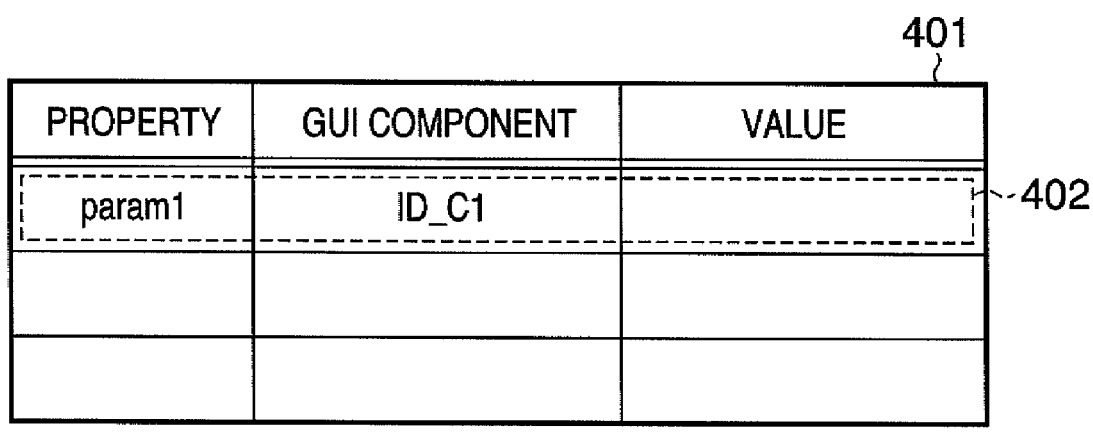
FIGS. 6A and 6B are (first) diagrams illustrating examples of a data model and a GUI screen.

FIG. 6A is a diagram illustrating an example of a data model obtained from the screen definition file in FIG. 5A when the Text Field type component is specified such that if the value of the attribute "key" is "property", there is an association with the data model.

Reference numeral 401 denotes the overall configuration of the data model.

Reference numeral 402 is a data region for a GUI component ID_C1 that is displayed in association with param1.

Figure 6B:
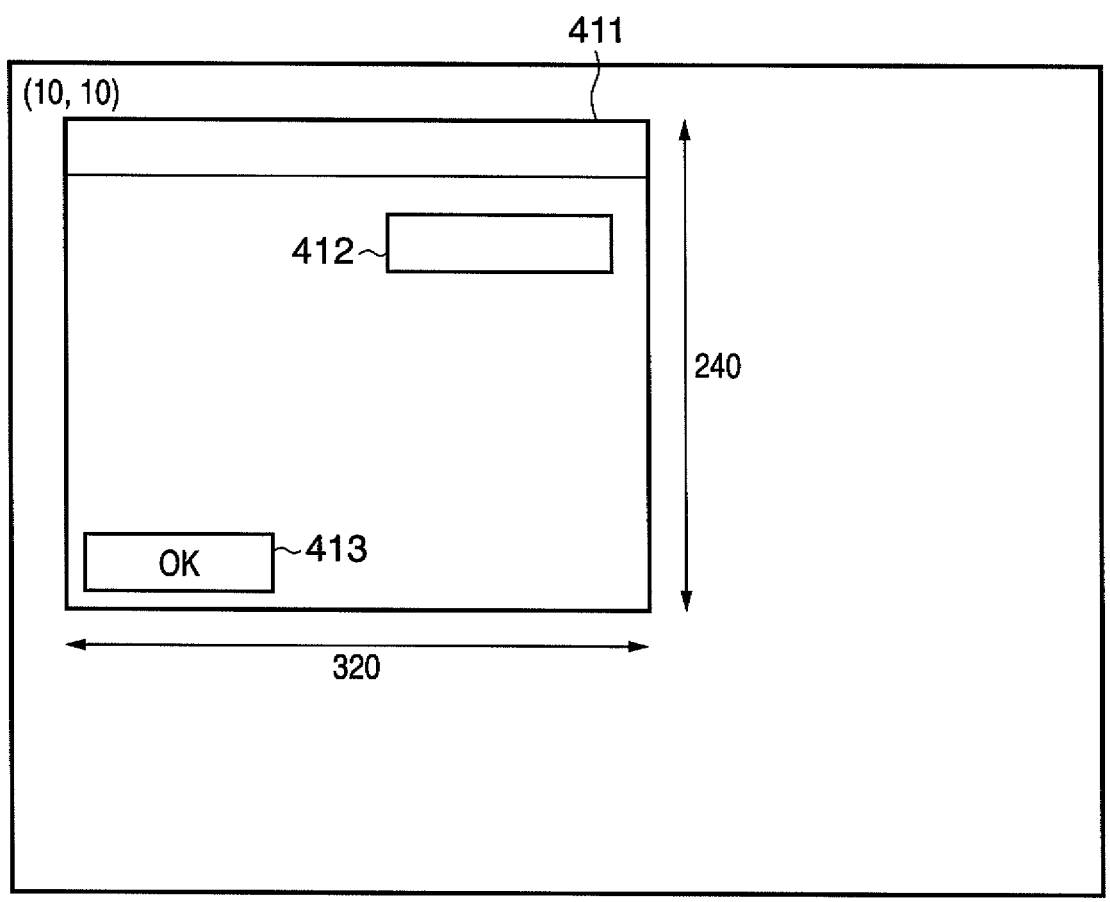

FIG. 6B is a diagram illustrating an example of a state in which the screen definition file in FIG. 5A is displayed on the output device 108.

Reference numeral 411 denotes a dialog as a screen unit. In the screen definition file, <bounds x="10" y="10" w="320" h="240"/> is written. Accordingly, the dialog 411 is displayed at the coordinates (10, 10) from the upper left of the output device 108 with a width of 320 and a height of 240 by the GUI control unit 201 in accordance with this statement.

Reference numeral 412 is a text field component, which is a displayed input/output GUI component, into which inputs such as character strings can be input. In the screen definition file, <bounds x="15" y="15" w="80" h="15"/> is written. Accordingly, the text field component is displayed at the coordinates (150, 50) from the upper left of the output device 108 with a width of 80 and a height of 15 by the GUI control unit 201 in accordance with this statement.

Reference numeral 413 denotes a button component, which is a displayed instruction GUI component. In the screen definition file, <bounds x="15" y="300" w="80" h="15"/> is written. Accordingly, the button component is displayed at the coordinates (15, 300) from the upper left of the output device 108 with a width of 80 and a height of 15 by the GUI control unit 201 in accordance with this statement.

Figure 7:
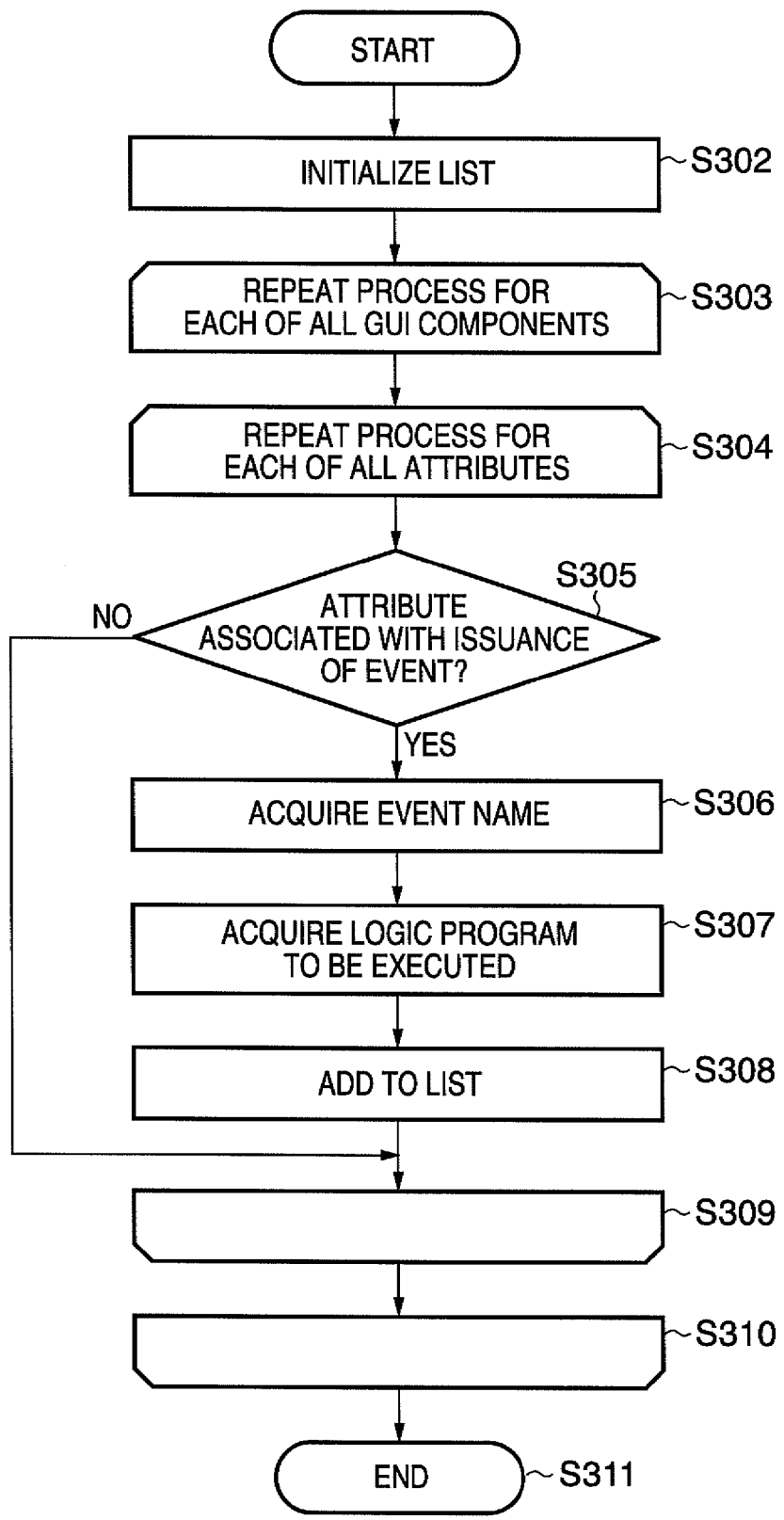
FIG. 7 is a flowchart illustrating in detail the process flow of the instruction GUI component creation process of step S108 in FIG. 3.

FIG. 7 is a flowchart illustrating in detail a process flow of the instruction GUI component creation process of step S108 in FIG. 3. In step S302, the GUI component generation unit 205 performs a process to initialize a list for creating an instruction GUI component.

In step S303, the GUI component generation unit 205 repeats the process ranging from step S304 to step S309 for each of all the GUI components in the screen definition file 202.

In step S304, the GUI component generation unit 205 repeats the process ranging from step S305 to step S308 for each of all the attributes of the GUI components.

In step S305, the GUI component generation unit 205 performs a process to acquire one attribute and to determine whether or not the attribute is an attribute whose type is associated with the issuance of an event. If the GUI component generation unit 205 determines that the attribute is an attribute associated with the issuance of an event, the process advances to step S306. Conversely, if the GUI component generation unit 205 determines that the attribute is an attribute that is not associated with the issuance of an event, the process advances to step S309.

In step S306, the GUI component generation unit 205 performs a process to acquire an event name for the attribute associated with the issuance of an event among the attributes of the GUI component. If the Button type GUI component in FIGS. 5A and 5B is specified such that if the value of the attribute "key" is "event", the event written in "value" is issued with a mouse click, then the GUI component generation unit 205 acquires "ev.ok".

In step S307, the GUI component generation unit 205 performs a process to acquire a logic program that is actually executed if an event is issued. For example, when the transition definition file is written as shown in reference numeral 311 in FIG. 5B, if the event "ev.ok" is issued, the GUI component generation unit 205 acquires the logic program A.

In step S308, the GUI component generation unit 205 performs a process to add the event name acquired in step S306 and the logic program acquired in step S307 to the list initialized in step S302.

In step S309, if the GUT component generation unit 205 finishes reflecting the settings for all attributes, the process advances to step S310.

In step S310, if the GUI component generation unit 205 finishes reflecting the settings for all components, the process advances to step S311, where the process shown in FIG. 7 ends.

The GUI component generation unit 205 creates the instruction GUI component in the manner as described above. If a user's operation (or event) such as depressing a button occurs in the instruction GUI component, the event name of the instruction GUI component is issued by the GUI control unit 201 (or instruction GUI component). As a result, the logic execution unit 211 executes the logic program associated with the event name.

Figure 8:
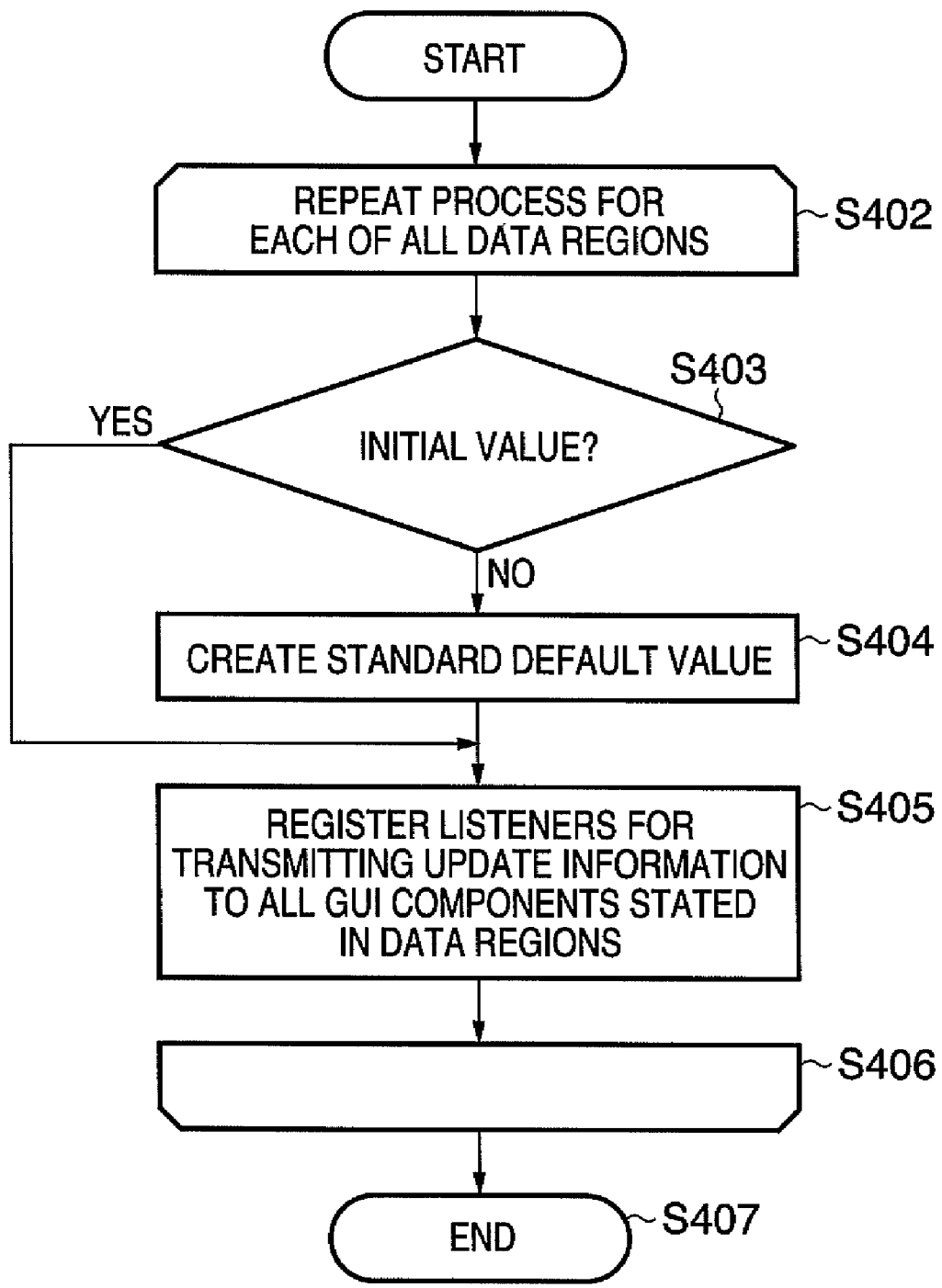
FIG. 8 is a flowchart illustrating in detail the process flow of the data model initialization process of step S109 in FIG. 3.

FIG. 8 is a flowchart illustrating in detail a process flow of the data model initialization process of step S109 in FIG. 3. In step S402, the data model reflection unit 210 repeats the process ranging from step S403 to step S405 for each of all the data regions in the data model shown in FIG. 6A.

In step S403, the data model reflection unit 210 performs a process to determine whether or not a value has been set in the data region. In step S403, if the data model reflection unit 210 determines that a value has already been set in the data region, the process advances to step S405. Conversely, if the data model reflection unit 210 determines in step S403 that a value is not set in the data region, the process advances to step S404.

In step S404, the data model reflection unit 210 performs a process to create a standard default value. The data model reflection unit creates 0, an empty character string or the like as the default value according to, for example, the specification of the input/output GUI component or the like, and registers it as the value of the data region.

In step S405, if a change is made in the data of the data region for the GUI component written in the data region, the data model reflection unit 210 performs listener registration so that the update is propagated to the GUI component associated with the data model. If the value of the data model is changed thereafter, the listener informs that the GUI component, which displays data in association with the value, has been updated. Upon receiving the propagated update transmitted, the GUI component sets an update flag so that the display is changed in the update process.

In step S406, if the data model reflection unit 210 finishes the value initialization for the data regions of the data model, the process advances to step S407, where the process shown in FIG. 8 ends.

FIG. 9 is a flowchart illustrating in detail a process flow of the input/output GUI component update process of step S110 in FIG. 3. In step S502, the data model reflection unit 210 repeats the process ranging from step S503 to step S508 for each of all the input/output GUI components created in step S107 in FIG. 3.

In step S503, the data model reflection unit 210 performs a process to determine whether or not the update flag is set in the input/output GUI component. The update flag is always set at first. If the value of the data model is changed the second time or thereafter, the update is propagated to the GUI component associated with the changed value, and upon receiving the update, the flag is set.

In step S503, if the data model reflection unit 210 determines that the update flag is not set in the input/output GUI component, the process advances to step S509. Conversely, if the data model reflection unit 210 determines in step S503 that the update flag is set in the input/output GUI component, the process advances to step S504.

In step S504, the data model reflection unit 210 performs a process to acquire the property value of the input/output GUI component.

In step S505, the data model reflection unit 210 performs a process to acquire the value of the data region that corresponds to the property value acquired in step S504 from the data model.

In step S506, the data model reflection unit 210 performs a process to determine whether or not the type of the value acquired in step S505 is a type that can be set directly in the position in which the GUI component is displayed. In step S506, if the data model reflection unit 210 determines that the type is a type that can be set directly, the process advances to S508. Conversely, if the data model reflection unit 210 determines in step S506 that the type is a type that cannot be set directly, the process advances to S507. For example, in the case of the Text Field type GUI component, if only a character string can be set, or if the value acquired from the data model is an int type number, because direct setting is impossible, the data model reflection unit 210 determines that it is a type that cannot be set directly.

In step S507, the data model reflection unit 210 converts the value into a displayable type. For example, when only a character string can be set, if an int type value of 100 is acquired, the data model reflection unit 210 converts it to a character string type value of 100 (i.e., the int type value of 100 is converted to a character string type value of 100).

In step S508, the data model reflection unit 210 performs a process to set the value acquired in step S505 or the value converted in step S507 to the attribute that displays the data unique to the GUI component.

In step S509, if the data model reflection unit 210 finishes the process for all the input/output GUI components associated with all data, the process advances to step S510, where the process shown in FIG. 9 ends.

FIG. 10A is a diagram of a data model.

Reference numeral 501 denotes that an int type value of 100 is set as the default value in the data region for param1 of the data model.

FIG. 10B is a diagram of a GUI screen displayed on the screen by the GUI control unit 201 and the data model reflection unit 210 in association with the data model after the GUI component generation unit 205 has loaded the screen definition file shown in FIG. 5A.

Reference numeral 502 denotes an input/output GUI component. As shown in FIG. 9, the data model reflection unit 210 acquires the int type value of 100 stored in the data region of the data model using, as a key, param1, which has been set as the attribute of the input/output GUI component, and converts the display type to the character string "100". Then, the data model reflection unit 210 (or GUI control unit 201) displays "100" on the GUI component. In the manner described above, the data model reflection unit 210 (or GUI control unit 201) changes the display in the GUI component in association with the values stored in the data model.

Figure 11:
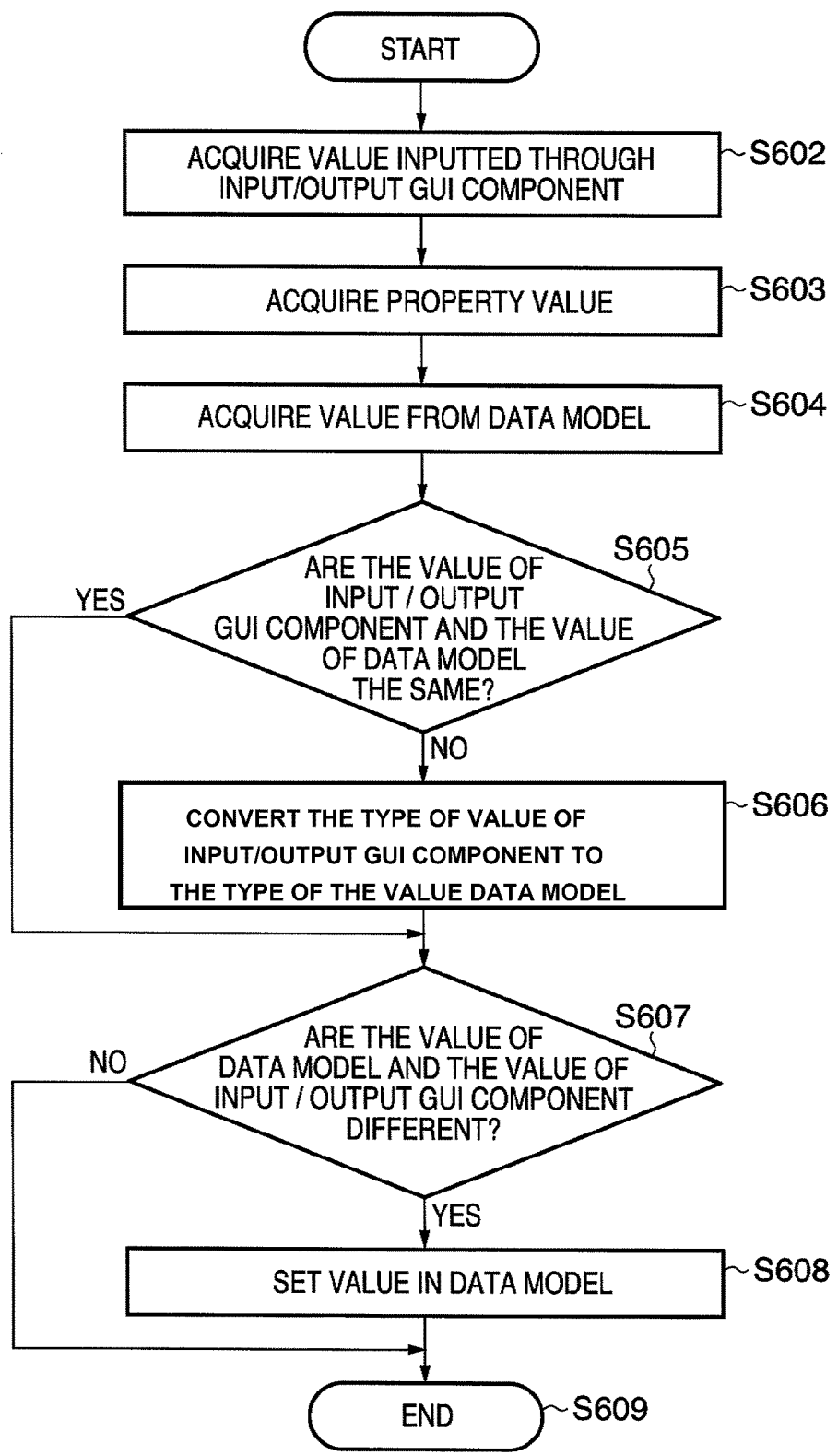
FIG. 11 is a flowchart illustrating a process flow of the input reflection process performed when the user provides an input to an input/output GUI component.

FIG. 11 is a flowchart illustrating a process flow of the input reflection process performed when the user provides an input to the input/output GUI component. Upon confirmation of an input input through the screen, in step S602, the data model reflection unit 210 performs a process to acquire the value displayed in the input/output GUI component after the input is confirmed.

In step S603, the data model reflection unit 210 performs a process to acquire the property value that has been set for the input/output GUI component.

In step S604, the data model reflection unit 210 performs a process to acquire the value of the data region of the data model based on the property value acquired in step S603.

In step S605, the data model reflection unit 210 performs a process to determine whether or not the type of the value displayed in the component acquired in step S602 is the same type as that of the value of the data model acquired in step S604. In step S605, if the data model reflection unit 210 determines that they are the same type, the process advances to S607. Conversely, if the data model reflection unit 210 determines in step S605 that they are different types, the process advances to S606.

In step S606, the data model reflection unit 210 performs a process to convert the type of the value obtained in step S602 to the same type as that of the data model obtained in step S604.

In step S607, the data model reflection unit 210 performs a process to determine whether or not the value obtained in step S602 and the value obtained in step S604 are the same by comparing them. In step S607, if the data model reflection unit 210 determines that they are the same, the process advances to S609, where the process shown in FIG. 11 ends. In step S607, if the data model reflection unit 210 determines that they are different, the process advances to S608.

In step S608, the data model reflection unit 210 performs a process to set the value obtained in step S602 as the value of the data model. Subsequently, the process advances to step S609, where the process shown in FIG. 11 ends.

Through the process as described above, the data model reflection unit 210 can reflect a value input by the user in the data model.

Figure 12:
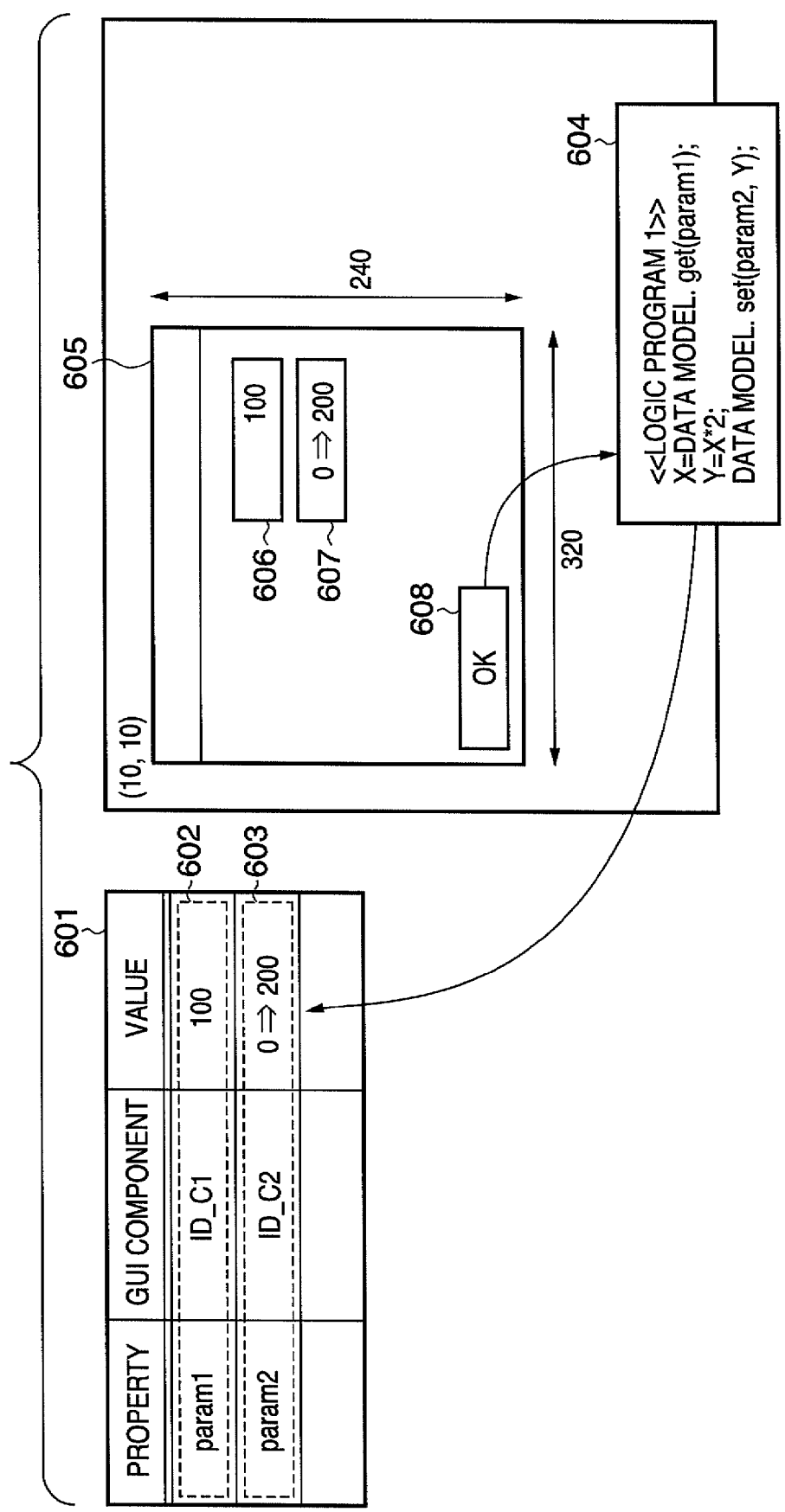
FIG. 12 is a diagram illustrating the association among a data model, a logic program and a GUI screen.

FIG. 12 is a diagram illustrating the association among a data model, a logic program and a GUI screen.

Reference numeral 601 denotes a data model.

Reference numeral 602 indicates that a default value of 100 is stored in the data region for param1 of the data model.

Reference numeral 603 indicates that a default value of 0 is stored in the data region for param2 of the data model.

Reference numeral 604 denotes a logic program in which the process to acquire data from param1 of the data model 601 and store the data in param2 of the data model 601 is written.

Reference numeral 605 denotes a GUI screen when the data model 601 is displayed on the screen.

Reference numeral 606 shows an input/output GUI component whose GUI component ID is ID_C1. The input/output GUI component 606 is associated with the data model 601 with param1, so "100" is displayed on the screen.

Reference numeral 607 shows an input/output GUI component whose GUI component ID is ID_C2. The input/output GUI component 607 is associated with the data model 601 with param2, so "0" is displayed on the screen.

Reference numeral 608 shows an instruction GUI component whose GUI component ID is ID_C3. If the user depresses the instruction GUI component 608 by operating the input device 106 or the like, the logic program 604 associated with the transition definition file 203 is executed by the logic execution unit 211.

Also, in FIG. 12, changes that are made in the data model 601 and the GUI screen 605 through the execution of the logic program 604 by depressing the instruction GUI component 608 are indicated with arrows. Reference numeral 603 shows that the value of the data region param2 of the data model has been changed from 0 to 200 through the execution of the logic program. Reference numeral 607 shows that the value of the input/output GUI component 607 has been changed from 0 to 200 along with the change of the value of param2 of the data model 601 through the execution of the logic program.

In the manner as described above, through the execution of the logic program according to the event involving the instruction GUI component, the data is reflected in the data model and the input/output GUI component, and then displayed on the GUI screen.

FIGS. 13A, 13B, 13C, 13D, 13E and 13F are diagrams of screen definition files and transition definition files before customization (change).

Reference numeral 701 in FIG. 13A is the transition definition file of the Main screen that is displayed first by the GUI control unit 201.

Figure 13B:
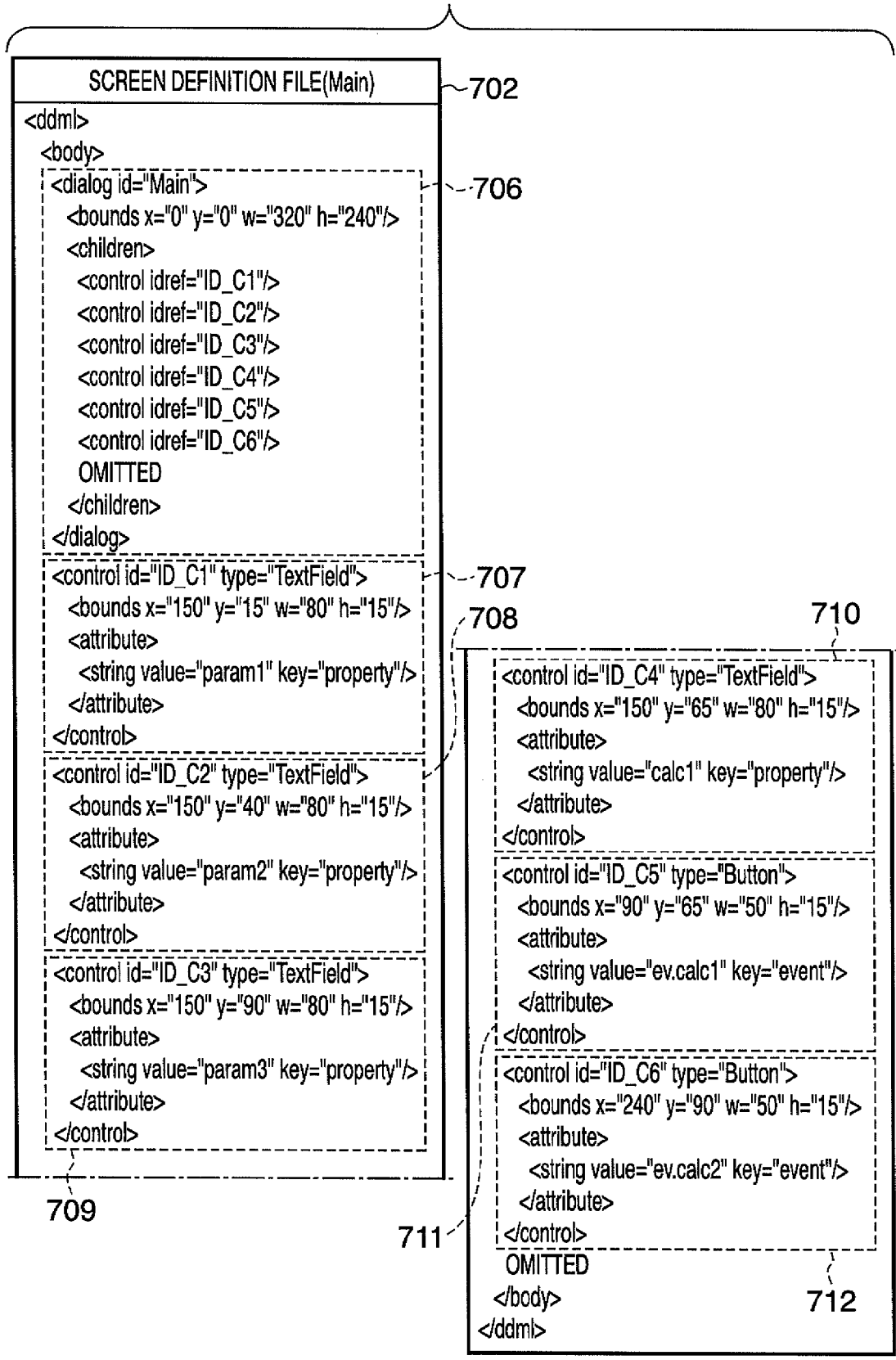

Reference numeral 702 in FIG. 13B denotes the screen definition file of the Main screen that is displayed first by the GUI control unit 201.

Reference numeral 703 denotes a portion that designates the screen definition file of the Main screen displayed first by the GUI control unit 201, and it is stated that the Main screen definition file 702 is designated.

Reference numeral 704 denotes a statement portion concerning an event handler (or a statement portion concerning a listener), where it is stated that the logic program A is executed if an event "ev.calc1" is issued.

Reference numeral 705 denotes another statement portion concerning an event handler different from that of reference numeral 704, where it is stated that the logic program B is executed if an event "ev.calc2" is issued. It is further stated that after the execution of logic program B, screen transition to a Sub screen is performed by .

Reference numeral 706 denotes a statement portion concerning the dialog, and it is stated that the GUI components written in the <children> tags are displayed by arranging the GUI components at the coordinates (0, 0) with a width of 320 and a height of 240 on the output device 108.

Reference numeral 707 denotes a statement portion concerning the GUI component whose GUI component ID is ID_C1, where it is stated that the GUI component is the input/output GUI component associated with the data model with the property value "param1".

Reference numeral 708 denotes a statement portion concerning the GUI component whose GUI component ID is ID_C2, where it is stated that the GUI component is the input/output GUI component associated with the data model with the property value "param2".

Reference numeral 709 denotes a statement portion concerning the GUI component whose GUI component ID is ID_C3, where it is stated that the GUI component is the input/output GUI component with the data model with the property value "param3".

Reference numeral 710 denotes a statement portion concerning a GUI component whose GUI component ID is ID_C4, where it is stated that the GUI component is the input/output GUI component associated with the data model with the property value "calc 1".

Reference numeral 711 denotes a statement portion concerning a GUI component whose GUI component ID is ID_C5, where it is stated that the GUI component is the instruction GUI component that issues an event "ev.calc1" when clicked with the mouse.

Reference numeral 712 denotes a statement portion concerning a GUI component whose GUI component ID is ID_C6, where it is stated that the GUI component is the instruction GUI component that issues an event "calc2ev.calc2" when clicked with the mouse.

Reference numeral 713 in FIG. 13C denotes the transition definition file of a Sub screen opened from the Main screen.

Reference numeral 714 in FIG. 13D denotes the screen definition file of the Sub screen.

Reference numeral 715 denotes a portion (statement portion) that designates the screen definition file of the Sub screen opened from the Main screen, where it is stated that the Sub screen definition file 714 is designated.

Reference numeral 716 denotes a statement portion concerning the dialog, where it is stated that the GUI component written in the <children> tags is displayed by arranging the GUI component at the coordinates (0, 0) with a width of 280 and a height of 180 on the output device 108.

Reference numeral 717 denotes a statement portion concerning a GUI component whose GUI component ID is ID_C11, where it is stated that the GUI component is the input/output GUI component associated with the data model with the property value "calc2".

Reference numeral 718 in FIG. 13E where a statement portion concerning a logic program, and it is stated that the values of param1 and param2 are acquired from the data model, calculation is performed, and the result is set in calc 1 of the data model. As stated in the transition definition file 701 and the screen definition file 702, if the instruction GUI component whose GUI component ID is ID_C5 is operated by the user, an event "ev.calc1" is issued. Then, as a result of the event "ev.calc1", a logic program A 718 is executed.

Reference numeral 719 in FIG. 13F denotes a statement portion concerning a logic program, where it is stated that the values of param1, param2 and param3 are acquired from the data model, calculation is performed, and the result is set in calc2 of the data model. As stated in the transition definition file 701 and the screen definition file 702, if the instruction GUI component whose GUI component ID is ID_C6 is operated by the user, an event "ev.calc2" is issued. Then, as a result of the event "ev.calc2", a logic program B 719 is executed.

Figure 14:
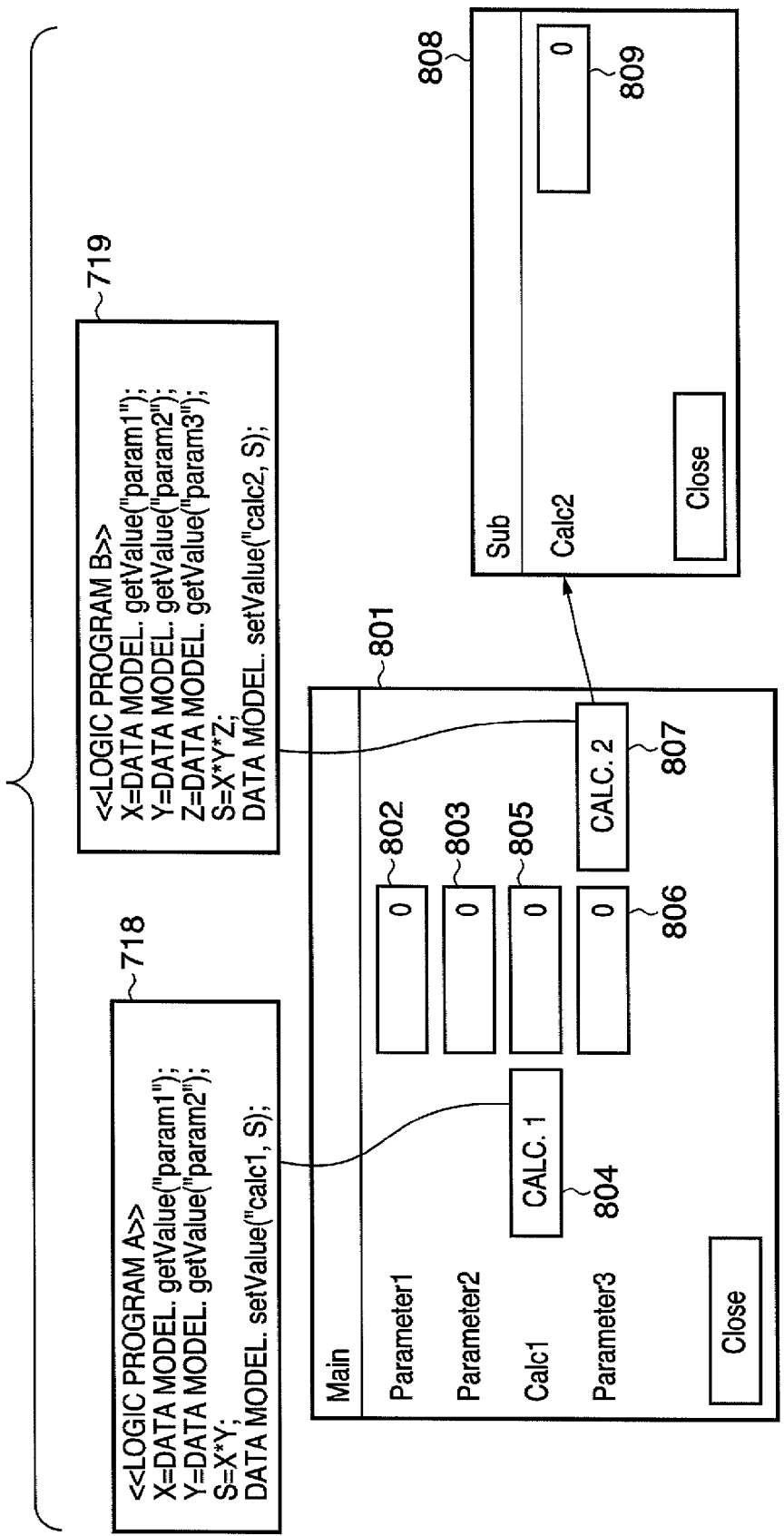
FIG. 14 is a diagram of GUI screens created based on the screen definition files and the transition definition files in FIGS. 13A, 13B, 13C, 13D, 13E and 13F.

FIG. 14 is a diagram of a GUI screen created based on the screen definition files and the transition definition files in FIGS. 13A, 13B, 13C, 13D, 13E and 13F. The screen image is displayed by an application (or the GUI control unit 201 or the GUI component generation unit 205) by loading the screen definition file and the transition definition file during startup, and performing processing based on the loaded files.

Reference numeral 801 denotes a screen image of the dialog according to the statement portion 706 in FIG. 13B, which is displayed at the coordinates (0, 0) with a width of 320 and a height of 240 on the output device 108.

Reference numeral 802 denotes a screen image of the input/output GUI component according to the statement portion 707 in FIG. 13B.

Reference numeral 803 denotes a screen image of the input/output GUI component according to the statement portion 708 in FIG. 13B.

Reference numeral 804 denotes a screen image of the instruction GUI component according to the statement portion 711 in FIG. 13B. If 804 is clicked with the mouse, the logic program A 718 is executed.

Reference numeral 805 denotes a screen image of the input/output GUI component according to the statement portion 710 in FIG. 13B. If a change is made in calc 1 of the data model, the corresponding GUI component is redisplayed by the data model reflection unit 210 or the like.

Reference numeral 806 denotes a screen image of the input/output GUI component according to the statement portion 709 in FIG. 13B.

Reference numeral 807 denotes a screen image of the instruction GUI component according to the statement portion 712 in FIG. 13B. If 807 is clicked with the mouse, the logic program B 719 is executed, and then a transition to a Sub screen is carried out.

Reference numeral 808 denotes a screen image of a dialog opened by the instruction GUI component 807. The dialog 808 is displayed at the position with the coordinates (0, 0) with a width of 280 and a height of 180 on the output device 108.

Reference numeral 809 denotes a screen image of the input/output GUI component according to the statement portion 717 in FIG. 13B. If a change is made in calc2 of the data model, the input/output GUI component 809 is redisplayed.

FIGS. 15A, 15B, 15C, 15D, 15E and 15F are diagrams illustrating the association between a data model and a screen image when the GUI screen of FIG. 14 is operated.

Reference numeral 901 in FIG. 15A denotes a screen image displayed when the user provides an input to the input/output GUI components 802 and 803 using the input device 106.

Reference numeral 902 in FIG. 15B denotes an image of a data model when the user provides an input to the input/output GUI components 802 and 803 using the input device 106. If a value of 10 is input into the input/output GUI component 802, and a value of 5 is input into the input/output GUI component 803, the values 10 and 5 are also set in param1 and param2 of the data model, respectively.

Reference numeral 903 in FIG. 15C denotes a screen image displayed when the logic program A 718 is executed in response to an instruction given to the instruction GUI component 804 through the input device 106 after an input is provided to the input/output GUI components 802 and 803.

Reference numeral 904 in FIG. 15D denotes an image of a data model when the logic program A 718 is executed in response to an instruction given to the instruction GUI component 804 through the input device 106 after an input is provided to the input/output GUI components 802 and 803. A value of 50 is set as the value of the property calc 1 of the data model, and as a result, the data is reflected on the screen.

Figure 15E:
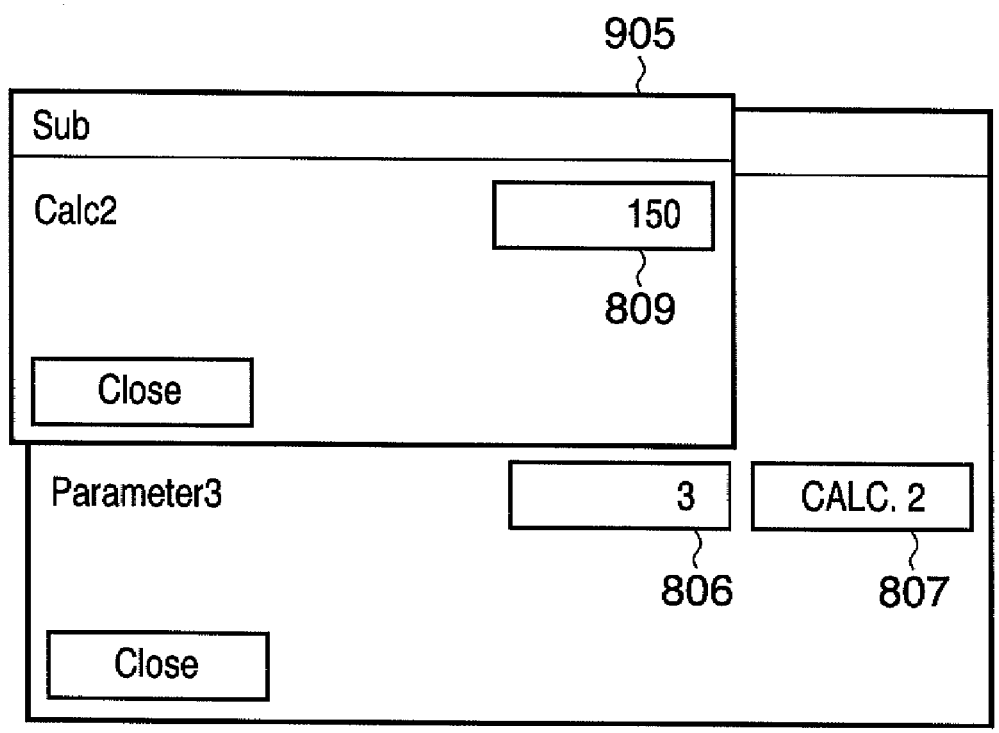

Reference numeral 905 in FIG. 15E denotes a screen image displayed when data is inputted into the input/output GUI component 806 through the input device 106 after the execution of the logic program A 718, an instruction is given to the instruction GUI component 807, and then the logic program B 719 is executed.

Reference numeral 906 in FIG. 15F denotes an image of a data model when data is input into the input/output GUI component 806 through the input device 106 after the execution of the logic program A 718, an instruction is given to the instruction GUI component 807, and then the logic program B 719 is executed. Through the execution of the logic program B 719, a value 150 is set as the value of the property calc2 of the data model, as a result, the value 150 is displayed in the input/output GUI component 809 of the Sub screen, which is the transition destination.

FIGS. 16A, 16B, 16C, 16D and 16E are diagrams of the screen definition file and the transition definition file after customization (change) to combine the content displayed on the Sub screen with the Main screen. As shown in FIGS. 16D and 16E, the logic program A 718 and the logic program B 719 are not changed from those shown in FIGS. 13E and 13F.

Reference numeral 1001 in FIG. 16B denotes a statement portion stating to refer to the input/output GUI component written in the screen definition file of the Sub screen, causing the GUI component to move across the screens.

Reference numeral 1002 denotes definition information of the GUI component of the input/output GUI component written in the screen definition file of the Sub screen, causing the component to move across the screens.

Reference numeral 1003 in FIG. 16A denotes the transition information of the transition definition file of the Main screen. By combining the screens, the screen transition is eliminated, so the transition information is deleted. The elimination of the screen transition makes the screen definition file and the transition definition files, which are required to display the Sub screen, unnecessary.

Reference numeral 1004 in FIG. 16B denotes information on the arrangement of the instruction GUI component, and the X and Y coordinates are changed. Reference numeral 1005 denotes information on the arrangement of the input/output GUI component, and the Y coordinate is changed.

FIG. 17 is a diagram of a GUI screen created based on the screen definition file and the transition definition file in FIGS. 16A, 16B, 16C, 16D and 16E. The GUI screen of FIG. 17 is changed from the GUI screen of FIG. 14 in appearance.

Reference numeral 1101 denotes the instruction GUI component whose arrangement has been changed through the editing of the screen definition file.

Reference numeral 1102 denotes the input/output GUI component whose arrangement has been changed across the screens through the editing of the screen definition file.

FIGS. 18A, 18B, 18C, 18D, 18E and 18F are diagrams illustrating the association between a data model and a screen image when the GUI screen of FIG. 17 is operated.

Figure 18A:
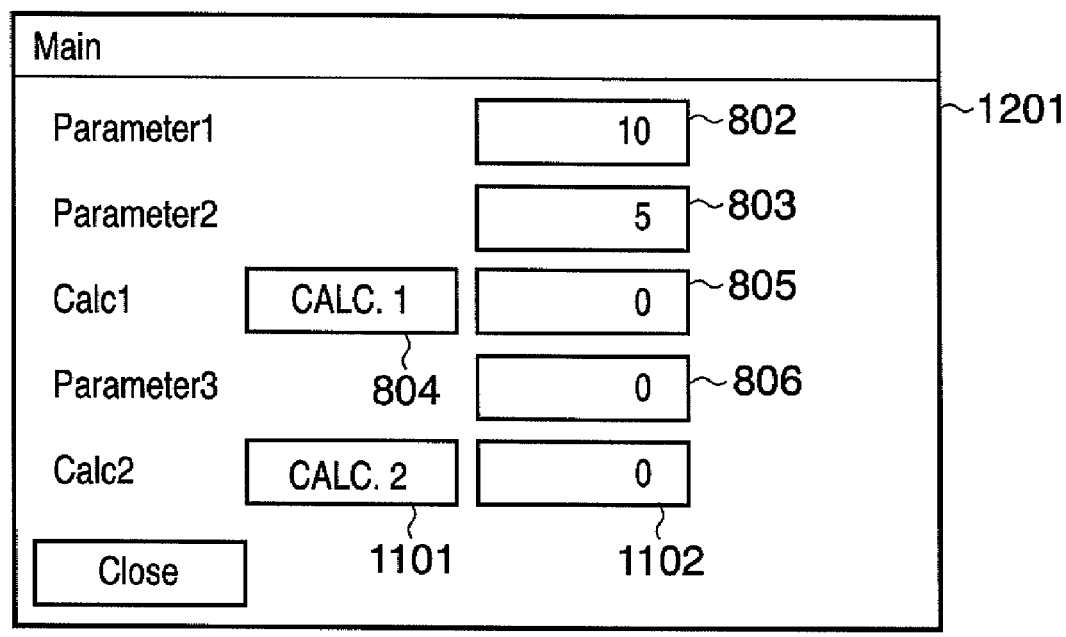

Reference numeral 1201 in FIG. 18A denotes a screen image displayed when the user provides an input to the input/output GUI components 802 and 803 using the input device 106.

Reference numeral 1202 in FIG. 18B denotes an image of a data model when the user provides an input to the input/output GUI components 802 and 803 using the input device 106. If a value of 10 is inputted into the input/output GUI component 802, and a value of 5 is input into the input/output GUI component 803, the values 10 and 5 are also set in param1 and param2 of the data model.

Reference numeral 1203 in FIG. 18C denotes a screen image displayed when the logic program A is executed in response to an instruction given to the instruction GUI component 804 through the input device 106 after an input is provided to the input/output GUI components 802 and 803.

Reference numeral 1204 in FIG. 18D denotes an image of a data model when the logic program A is executed in response to an instruction given to the instruction GUI component 804 through the input device 106 after an input is provided to the input/output GUI components 802 and 803. A value of 50 is set as the value of the property calc 1 of the data model, and as a result, the data is reflected on the screen.

Figure 18E:
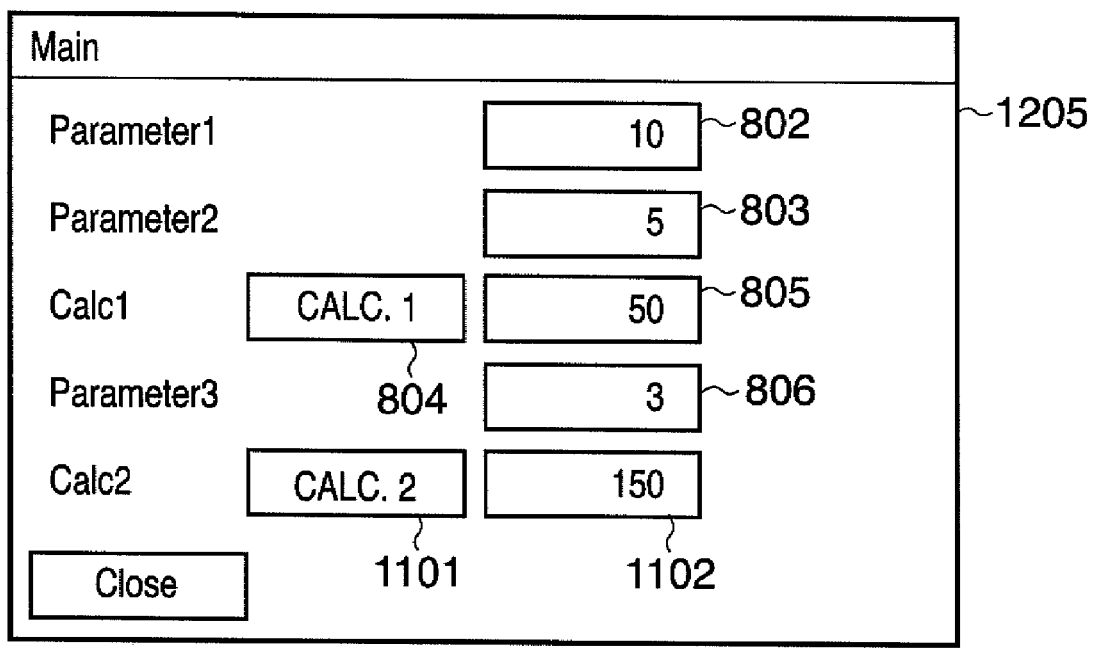

Reference numeral 1205 in FIG. 18E denotes a screen image displayed when, after the execution of the logic program A 718 in response to an instruction given to the GUI component 804, data is input into the input/output GUI component 806, an instruction is given to the instruction GUI component 1101, and then the logic program B is executed.

Reference numeral 1206 in FIG. 18F is an image of a data model when, after the execution of the logic program A 718 in response to an instruction given to the GUI component 804, data is input into the input/output GUI component 806, an instruction is given to the instruction GUI component 1101, and then the logic program B is executed. Through the execution of the logic program B, a value of 150 is set as the value of the property calc2 of the data model, and as a result, the value 150 is displayed in the input/output GUI component 1102. In other words, from FIGS. 18A, 18B, 18C, 18D, 18E and 18F, it can be seen that even when the input/output GUI component that displays the result of the logic program is moved across the screens, screen display is effected without any problems.

As described above, according to the present invention, a change across the screens can be achieved without rewriting part of programs.

Other Embodiments

The object of the present invention is also achieved in the following manner: a recording medium (or storage medium)

in which program code of software that realizes the functionality of the above-described embodiment is recorded is provided to a system or apparatus. Then, the program code stored in the recording medium is read out and executed by the computer (or CPU or MPU) of the system or apparatus. In this case, the program code read out from the recording medium realizes the functionality of the above-described embodiment, so the recording medium in which the program code is recorded constitutes the present invention.

Also, a case, in which an operating system (OS) or the like that is running on the computer performs some or all of the actual processing based on the instructions of the program code by executing the program code read out by the computer, and the functionality of the above-described embodiment is realized by that processing, also falls within the scope of the present invention.

Furthermore, a case, in which the program code read out from the recoding medium is written into a memory provided in a function expansion card inserted into the computer or a function expansion unit connected to the computer, after which a CPU or the like provided in the function expansion card or function expansion unit executes some or all of the actual processing based on the instructions of the program code, and the functionality of the above-described embodiment is realized by that processing, also falls within the scope of the present invention.

When the present invention is applied to the above-described recording medium, the recording medium should store program code that corresponds to the flowchart described earlier.

Preferred embodiments of the present invention have been described in detail above, but it is to be noted that the present invention is not limited to these specific embodiments, and various modifications and changes can be made within the scope of the present invention defined in the appended claims.

As described above, according to the present invention, a change across screens can be achieved without rewriting part of programs.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-350155, filed Dec. 26, 2006, which is hereby incorporated by reference herein in its entirety.

What is claimed is:

1. A graphic user interface (GUI) generation apparatus for generating GUIs of WEB screens comprising:
a storage unit adapted to store association information that associates an input/output GUI component relating to the input and output of data with a data model that is common to a plurality of screens and stores data, a screen definition file containing screen configuration information regarding the arrangement of the input/output GUI component and an instruction GUI component which accepts an instruction from a user, and a transition definition file which defines and associates a logic program executing an event corresponding to the instruction accepted via the instruction GUI component with a screen to be transited to in response to the execution of the logic program;
a reflection unit adapted to, upon receiving an input of data through the input/output GUI component, reflect the inputted data in the data model that is associated with the input/output GUI component in the association information;
a generation unit adapted to generate a screen including the input/output GUI component and the instruction GUI component by loading the transition definition file and the screen definition file from the storage unit;
an event obtaining unit adapted to obtain an event corresponding to the instruction accepted via the instruction GUI component;
an obtaining unit adapted to obtain a screen to be transited to and a logic program corresponding to the event based on the transition definition file; and
a logic execution unit adapted to execute the logic program obtained by the obtaining unit,
wherein the logic execution unit acquires the data of the data model reflected by the reflection unit, and stores, in the data model, the data of the processing result by the logic program with the use of the acquired data, based on the logic program without rewriting the logic program,
wherein the generation unit updates a screen into a screen to be transited to based on both a screen to be transited to obtained by the obtaining unit and the data model in which the reflection unit has reflected the input data and which has stored processing result data executed by the logic execution unit, and
wherein the reflection unit determines whether a data type of a first value of data input via the input/output GUI component matches a data type of a second value of a data field of the data model obtained based on a property value which has been set for the input/output GUI component or not, converts the data type of the first value into that of the second value if the data type of the first value does not match that of the second value, and reflects the input data into the data model by setting the second value into a data field of the data model if the first value is different from the second value.

2. A method for generating a graphic user interface (GUI) in a GUI generation apparatus for generating a GUI of WEB screens having a storage unit adapted to store association information that associates an input/output GUI component relating to the input and output of data with a data model that is common to a plurality of screens and stores data, a screen definition file containing screen configuration information on the arrangement of the input/output GUI component and an instruction GUI component which accepts an instruction from a user, and a transition definition file which defines and associates a logic program executing an event corresponding to the instruction accepted via the instruction GUI component with a screen to be transited to in response to the execution of the logic program, comprising:
a reflection step of, upon receiving an input of data through the input/output GUI component, reflecting the inputted data in the data model that is associated with the input/output GUI component in the association information;
a generation step of generating a screen including the input/output GUI component and the instruction GUI component by loading the transition definition file and the screen definition file from the storage unit;
an event obtaining step of obtaining an event corresponding to the instruction accepted via the instruction GUI component;
an obtaining step of obtaining a screen to be transited to and a logic program corresponding to the event based on the transition definition file; and
a logic execution step of executing the logic program obtained in the obtaining step, wherein, in the logic execution step, the data of the data model reflected in the reflection step is acquired, and the data of the processing result executed by the logic program with the use of the acquired data is stored in the data model, based on the logic program without rewriting the logic program, wherein, in the generation step, a screen is updated to a screen to be transited to based on both a screen to be transited to obtained in the obtaining step and the data model in which in the reflection step has reflected the input data and which has stored processing result data executed in the logic execution step, and wherein, in the reflection step, it is determined whether or not a data type of a first value of data input via the input/output GUI component matches a date type of a second value of a data field of the data model obtained based on a property value which has been set for the input/output GUI component, the data type of the first value is converted into that of the second value if the data type of the first value does not match that of the second value, and the input data is reflected into the data model by setting the second value into a data field of the data model if the first value is different from the second value.

3. A non-transitory storage medium that stores a program that causes a computer to execute the steps of the method for generating a graphic user interface (GUI) described in claim 2.

4. The apparatus according to claim 1, wherein the generation unit reads the screen definition file to acquire the input/output GUI component together with a property value of the instruction GUI component, and generates a data region using said property value as its name.

5. The method according to claim 2, wherein the generation step reads the screen definition file to acquire the input/output GUI component together with a property value of the instruction GUI component, and generates a data region using said property value as its name.

* * * * *